(12) United States Patent
Nam

(10) Patent No.: US 9,344,172 B2
(45) Date of Patent: May 17, 2016

(54) CODEBOOK DESIGN AND STRUCTURE FOR ADVANCED WIRELESS COMMUNICATION SYSTEMS

(71) Applicant: Samsung Electronics Co., Ltd., Suwon-si, Gyeonggi-do (KR)

(72) Inventor: Young-Han Nam, Plano, TX (US)

(73) Assignee: Samsung Electronics Co., Ltd., Suwon-si (KR)

(*) Notice: Subject to any disclaimer, the term of this patent is extended or adjusted under 35 U.S.C. 154(b) by 0 days.

(21) Appl. No.: 14/801,614

(22) Filed: Jul. 16, 2015

(65) Prior Publication Data

US 2016/0043791 A1   Feb. 11, 2016

Related U.S. Application Data

(60) Provisional application No. 62/035,281, filed on Aug. 8, 2014, provisional application No. 62/127,142, filed on Mar. 2, 2015.

(51) Int. Cl.
*H04B 7/04* (2006.01)
*H04B 7/06* (2006.01)

(52) U.S. Cl.
CPC ............ *H04B 7/0482* (2013.01); *H04B 7/0626* (2013.01)

(58) Field of Classification Search
CPC .. H04B 7/0639; H04B 7/0626; H04B 7/0632; H04B 7/0469; H04B 7/0486; H04B 7/0478
See application file for complete search history.

(56) References Cited

U.S. PATENT DOCUMENTS

| 2012/0039251 | A1* | 2/2012 | Sayana et al. | 370/328 |
|---|---|---|---|---|
| 2013/0303230 | A1* | 11/2013 | Sayana et al. | 455/524 |
| 2013/0308714 | A1 | 11/2013 | Xu et al. | |
| 2013/0322376 | A1* | 12/2013 | Marinier et al. | 370/329 |
| 2014/0016549 | A1 | 1/2014 | Novlan et al. | |
| 2014/0098689 | A1 | 4/2014 | Lee et al. | |
| 2014/0177683 | A1* | 6/2014 | Krishnamurthy et al. | 375/219 |
| 2014/0177744 | A1* | 6/2014 | Krishnamurthy et al. | 375/267 |
| 2014/0254508 | A1* | 9/2014 | Krishnamurthy et al. | 370/329 |
| 2014/0328422 | A1* | 11/2014 | Chen et al. | 375/267 |

OTHER PUBLICATIONS

International Search Report dated Dec. 17, 2015 in connection with International Patent Application No. PCT/KR2015/008135; 3 pages.
International Written Opinion dated Dec. 17, 2015 in connection with International Patent Application No. PCT/KR2015/008135; 6 pages.
3GPP TSG RAN WG1 #66; "Considerations on CSI feedback enhancements for high-priority antenna configurations"; R1-112420; Athens, Greece; Aug. 22-26, 2011; 7 pages.
3GPP TSG RAN Meeting #76; "Clarification on PUCCH Mode 1-1 for 4Tx Dual Codebook"; Change Request; R1-140782; Prague, Czeck Republic; Feb. 10-14, 2014; 2 pages.

* cited by examiner

*Primary Examiner* — Aristocratis Fotakis

(57) ABSTRACT

A base station includes a transceiver configured to transmit CSI-RS according to a CSI-RS configuration comprising a first and a second numbers of antenna ports, and downlink signals comprising the CSI-RS configuration to the UE, and, receive uplink signals comprising a plurality of CSI reports from the UE, and a processor configured to extract an RI and at least PMIs from the plurality of CSI reports, determine a component precoder on the first number of antenna ports, using a first PMI and a second PMI, determine a complex number u, using a third PMI, and determine a composite precoder equal to a block matrix comprising $N_r$ row blocks whose n-th row block is a product of $u^{n-1}$ and the component precoder, wherein $N_r$ is equal to the second number of antenna ports.

20 Claims, 12 Drawing Sheets

US 9,344,172 B2

CODEBOOK DESIGN AND STRUCTURE FOR ADVANCED WIRELESS COMMUNICATION SYSTEMS

CROSS-REFERENCE TO RELATED APPLICATION AND CLAIM OF PRIORITY

The present application claims priority to U.S. Provisional Patent Application Ser. No. 62/035,281, filed Aug. 8, 2014, entitled "CHANNEL STATE INFORMATION REPORTING FOR ADVANCED WIRELESS COMMUNICATION SYSTEMS". The present application claims priority to U.S. Provisional Patent Application Ser. No. 62/127,142, filed Mar. 2, 2015, entitled "CHANNEL STATE INFORMATION REPORTING FOR ADVANCED WIRELESS COMMUNICATION SYSTEMS". The content of the above-identified patent documents is incorporated herein by reference.

TECHNICAL FIELD

The present disclosure relates generally to a codebook design and structure associated with a two dimensional transmit antennas array. Such two dimensional arrays are associated with a type of multiple-input-multiple-output (MIMO) system often termed "full-dimension" MIMO (FD-MIMO).

BACKGROUND

Wireless communication has been one of the most successful innovations in modern history. Recently, the number of subscribers to wireless communication services exceeded five billion and continues to grow quickly. The demand of wireless data traffic is rapidly increasing due to the growing popularity among consumers and businesses of smart phones and other mobile data devices, such as tablets, "note pad" computers, net books, eBook readers, and machine type of devices. In order to meet the high growth in mobile data traffic and support new applications and deployments, improvements in radio interface efficiency and coverage is of paramount importance.

SUMMARY

In a first embodiment, a base station configured to communicate with a user equipment (UE) includes a transceiver configured to transmit, to the UE, Channel State Information-Reference Signal (CSI-RS) according to a CSI-RS configuration comprising a first and a second numbers of antenna ports and downlink signals comprising the CSI-RS configuration, and, receive uplink signals comprising a plurality of CSI reports from the UE, and a processor configured to extract a rank indicator (RI) and at least three precoder matrix indicators (PMIs) from the plurality of CSI reports, determine a component precoder on the first number of antenna ports, using a first PMI and a second PMI among the at least three PMIs, determine a complex number u, using a third PMI among the at least three PMIs, and determine a composite precoder equal to a block matrix comprising $N_r$ row blocks whose n-th row block is a product of $u^{n-1}$ and the component precoder, wherein $N_r$ is equal to the second number of antenna ports, and $n \in \{1, 2, \ldots, N_r\}$.

In a second embodiment, a method for communicating with a user equipment (UE) includes transmitting, to the UE, Channel State Information-Reference Signal (CSI-RS) according to a CSI-RS configuration comprising a first and a second numbers of antenna ports, and downlink signals comprising the CSI-RS configuration, receiving uplink signals comprising a plurality of CSI reports from the UE, extracting a rank indicator (RI) and at least three precoder matrix indicators (PMIs) from the plurality of CSI reports, determining a component precoder on the first number of antenna ports, using a first PMI and a second PMI among the at least three PMIs, determining a complex number u, using a third PMI among the at least three PMIs, and determining a composite precoder equal to a block matrix comprising $N_r$ row blocks whose n-th row block is a product of $u^{n-1}$ and the component precoder, where $N_r$ is equal to the second number of antenna ports, and $n \in \{1, 2, \ldots, N_r\}$.

In a third embodiment, a user equipment (UE) configured to communicate with a base station includes a transceiver configured to receive, from the BS, Channel State Information-Reference Signal (CSI-RS) according to a CSI-RS configuration comprising a first and a second numbers of antenna ports, and downlink signals comprising the CSI-RS configuration, and transmit, to the BS, uplink signals comprising a plurality of CSI reports comprising a rank indicator (RI) and at least three precoder matrix indicators (PMIs), and a processor configured to determine the RI and the at least three PMIs based on a composite precoder derived with the received CSI-RS, wherein the at least three PMIs comprises a first PMI and a second PMI used to indicate a component precoder on the first number of antenna ports for the RI, and a third PMI used to indicate a complex number u, and the composite precoder is a block matrix comprising $N_r$ row blocks whose n-th row block is a product of $u^{n-1}$ and the component precoder, wherein $N_r$ is equal to the second number of antenna ports, and $n \in \{1, 2, \ldots, N_r\}$.

determine the at least three PMIs based on the received CSI-RS according to the CSI-RS configuration, the at least three PMIs comprising a first PMI and a second PMI, used to identify a component precoder on the first number of antenna ports for the RI, and a third PMI used to determine a complex number u to identify a composite precoder comprising a block matrix comprising $N_r$ row blocks whose n-th row block is a product of $u^{n-1}$ and the component precoder, wherein $N_r$ is equal to the second number of antenna ports, and $n \in \{1, 2, \ldots, N_r\}$.

In a fourth embodiment, a method for communicating with a base station includes Receiving, from the BS, Channel State Information-Reference Signal (CSI-RS) according to a CSI-RS configuration comprising a first and a second numbers of antenna ports and downlink signals comprising the CSI-RS configuration, and determining a rank indicator (RI) and at least three precoder matrix indicators (PMIs) based on a composite precoder derived with the received CSI-RS, wherein the at least three PMIs comprises a first PMI and a second PMI used to indicate a component precoder on the first number of antenna ports for the RI, and a third PMI used to indicate a complex number u, and the composite precoder is a block matrix comprising $N_r$ row blocks whose n-th row block is a product of $u^{n-1}$ and the component precoder, wherein $N_r$ is equal to the second number of antenna ports, and $n \in \{1, 2, \ldots, N_r\}$, and transmitting, to the BS, uplink signals comprising a plurality of CSI reports comprising the RI and the at least three PMIs.

Other technical features may be readily apparent to one skilled in the art from the following figures, descriptions, and claims.

Before undertaking the DETAILED DESCRIPTION below, it may be advantageous to set forth definitions of certain words and phrases used throughout this patent document. The term "couple" and its derivatives refer to any direct or indirect communication between two or more elements, whether or not those elements are in physical contact with one another. The terms "transmit," "receive," and "communicate," as well as derivatives thereof, encompass both direct and indirect communication. The terms "include" and "comprise," as well as derivatives thereof, mean inclusion without limitation. The term "or" is inclusive, meaning and/or. The phrase "associated with," as well as derivatives thereof, means to include, be included within, interconnect with, contain, be contained within, connect to or with, couple to or with, be communicable with, cooperate with, interleave, juxtapose, be proximate to, be bound to or with, have, have a property of, have a relationship to or with, or the like. The term "controller" means any device, system or part thereof that controls at least one operation. Such a controller may be implemented in hardware or a combination of hardware and software and/or firmware. The functionality associated with any particular controller may be centralized or distributed, whether locally or remotely. The phrase "at least one of," when used with a list of items, means that different combinations of one or more of the listed items may be used, and only one item in the list may be needed. For example, "at least one of: A, B, and C" includes any of the following combinations: A, B, C, A and B, A and C, B and C, and A and B and C.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for other certain words and phrases are provided throughout this patent document. Those of ordinary skill in the art should understand that in many if not most instances, such definitions apply to prior as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION

FIGS. 1 through 12B, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged wireless communication system.

List of Acronyms
MIMO: multiple-input-multiple-output
SU-MIMO: single-user MIMO
MU-MIMO: multi-user MIMO
3GPP: 3rd generation partnership project
LTE: long-term evolution
UE: user equipment
eNB: eNodeB
(P)RB: (physical) resource block
OCC: orthogonal cover code
DMRS: demodulation reference signal(s)
UE-RS: UE-specific reference signal(s)
CSI-RS: channel state information reference signals
SCID: scrambling identity
MCS: modulation and coding scheme
RE: resource element
CQI: channel quality information
PMI: precoding matrix indicator
RI: rank indicator
MU-CQI: multi-user CQI
CSI: channel state information
CSI-IM: CSI interference measurement
CoMP: coordinated multi-point
NZP: non-zero power
DCI: downlink control information
DL: downlink
UL: uplink
PDSCH: physical downlink shared channel
PDCCH: physical downlink control channel
PUSCH: physical uplink shared channel
PUCCH: physical uplink control channel
CDM: code-division multiplexing
RRC: radio resource control The following documents and standards descriptions are hereby incorporated into the present disclosure as if fully set forth herein: (1) 3GPP TS 36.211, "E-UTRA, Physical channels and modulation", Release-12; (2) 3GPP TS 36.212, "E-UTRA, Multiplexing and channel coding", Release-12; and (3) 3GPP TS 36.213, "E-UTRA, Physical layer procedures", Release-12.

Figure 1:
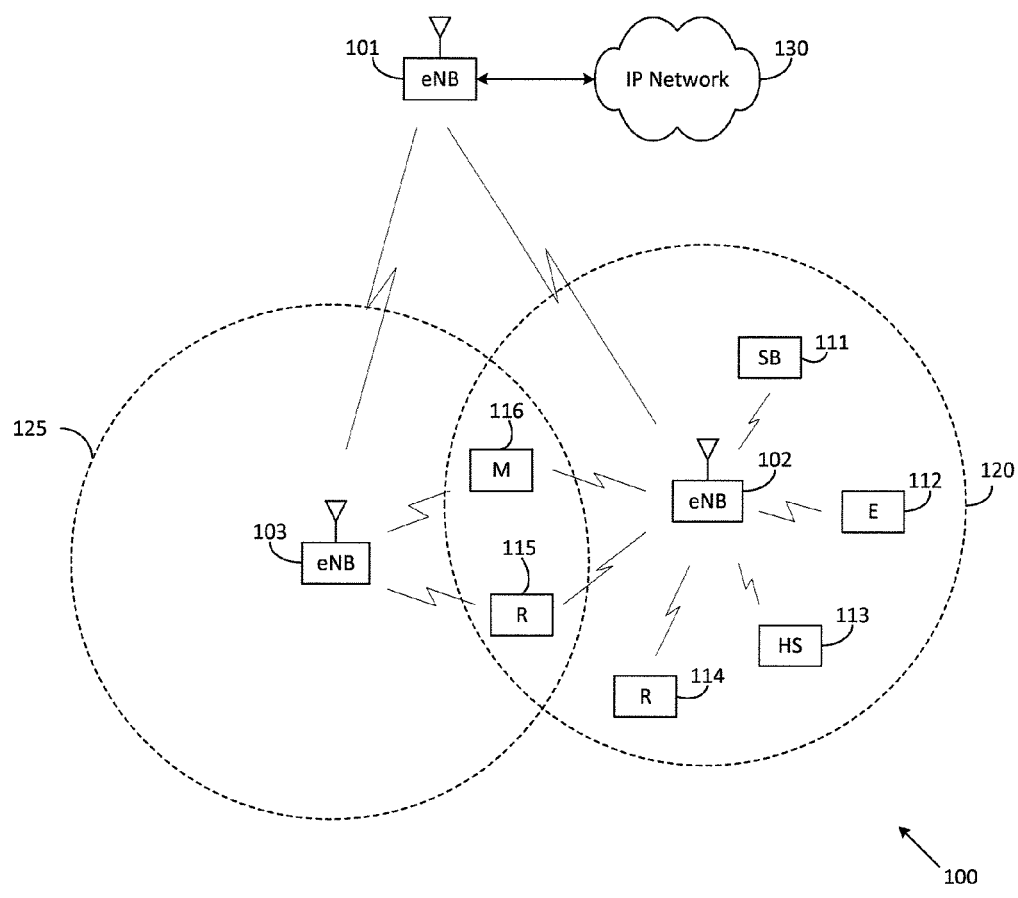
FIG. 1 illustrates an example wireless network according to this disclosure.

FIG. 1 illustrates an example wireless network 100 according to this disclosure. The embodiment of the wireless network 100 shown in FIG. 1 is for illustration only. Other embodiments of the wireless network 100 could be used without departing from the scope of this disclosure.

The wireless network 100 includes an eNodeB (eNB) 101, an eNB 102, and an eNB 103. The eNB 101 communicates with the eNB 102 and the eNB 103. The eNB 101 also communicates with at least one Internet Protocol (IP) network 130, such as the Internet, a proprietary IP network, or other data network.

Depending on the network type, other well-known terms may be used instead of "eNodeB" or "eNB," such as "base station" or "access point." For the sake of convenience, the terms "eNodeB" and "eNB" are used in this patent document to refer to network infrastructure components that provide wireless access to remote terminals. Also, depending on the network type, other well-known terms may be used instead of "user equipment" or "UE," such as "mobile station," "subscriber station," "remote terminal," "wireless terminal," or "user device." For the sake of convenience, the terms "user equipment" and "UE" are used in this patent document to refer to remote wireless equipment that wirelessly accesses an eNB, whether the UE is a mobile device (such as a mobile telephone or smartphone) or is normally considered a stationary device (such as a desktop computer or vending machine).

The eNB 102 provides wireless broadband access to the network 130 for a first plurality of user equipments (UEs) within a coverage area 120 of the eNB 102. The first plurality of UEs includes a UE 111, which may be located in a small business (SB); a UE 112, which may be located in an enterprise (E); a UE 113, which may be located in a WiFi hotspot (HS); a UE 114, which may be located in a first residence (R); a UE 115, which may be located in a second residence (R); and a UE 116, which may be a mobile device (M) like a cell phone, a wireless laptop, a wireless PDA, or the like. The eNB 103 provides wireless broadband access to the network 130 for a second plurality of UEs within a coverage area 125 of the eNB 103. The second plurality of UEs includes the UE 115 and the UE 116. In some embodiments, one or more of the eNBs 101-103 may communicate with each other and with the UEs 111-116 using 5G, LTE, LTE-A, WiMAX, or other advanced wireless communication techniques.

Dotted lines show the approximate extents of the coverage areas 120 and 125, which are shown as approximately circular for the purposes of illustration and explanation only. It should be clearly understood that the coverage areas associated with eNBs, such as the coverage areas 120 and 125, may have other shapes, including irregular shapes, depending upon the configuration of the eNBs and variations in the radio environment associated with natural and man-made obstructions.

As described in more detail below, one or more of BS 101, BS 102 and BS 103 include 2D antenna arrays as described in embodiments of the present disclosure. In some embodiments, one or more of BS 101, BS 102 and BS 103 support the codebook design and structure for systems having 2D antenna arrays.

Although FIG. 1 illustrates one example of a wireless network 100, various changes may be made to FIG. 1. For example, the wireless network 100 could include any number of eNBs and any number of UEs in any suitable arrangement. Also, the eNB 101 could communicate directly with any number of UEs and provide those UEs with wireless broadband access to the network 130. Similarly, each eNB 102-103 could communicate directly with the network 130 and provide UEs with direct wireless broadband access to the network 130. Further, the eNB 101, 102, and/or 103 could provide access to other or additional external networks, such as external telephone networks or other types of data networks.

Figure 2A:
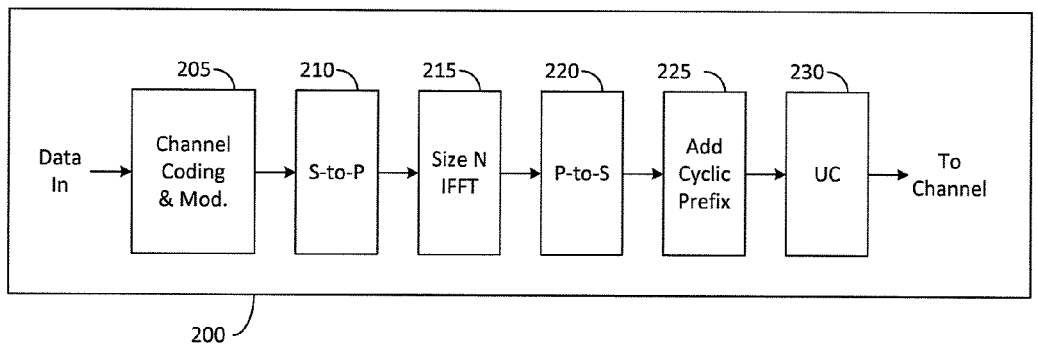
FIGS. 2A and 2B illustrate example wireless transmit and receive paths according to this disclosure.
Figure 2B:
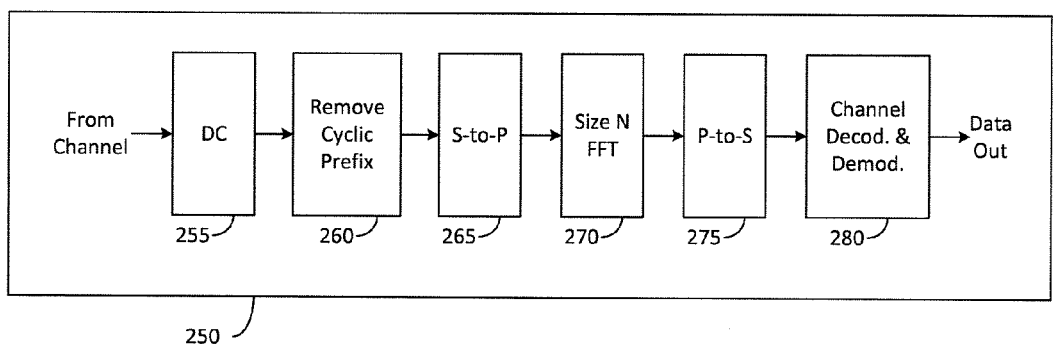

FIGS. 2A and 2B illustrate example wireless transmit and receive paths according to this disclosure. In the following description, a transmit path 200 may be described as being implemented in an eNB (such as eNB 102), while a receive path 250 may be described as being implemented in a UE (such as UE 116). However, it will be understood that the receive path 250 could be implemented in an eNB and that the transmit path 200 could be implemented in a UE. In some embodiments, the receive path 250 is configured to support the codebook design and structure for systems having 2D antenna arrays as described in embodiments of the present disclosure.

The transmit path 200 includes a channel coding and modulation block 205, a serial-to-parallel (S-to-P) block 210, a size N Inverse Fast Fourier Transform (IFFT) block 215, a parallel-to-serial (P-to-S) block 220, an add cyclic prefix block 225, and an up-converter (UC) 230. The receive path 250 includes a down-converter (DC) 255, a remove cyclic prefix block 260, a serial-to-parallel (S-to-P) block 265, a size N Fast Fourier Transform (FFT) block 270, a parallel-to-serial (P-to-S) block 275, and a channel decoding and demodulation block 280.

In the transmit path 200, the channel coding and modulation block 205 receives a set of information bits, applies coding (such as a low-density parity check (LDPC) coding), and modulates the input bits (such as with Quadrature Phase Shift Keying (QPSK) or Quadrature Amplitude Modulation (QAM)) to generate a sequence of frequency-domain modulation symbols. The serial-to-parallel block 210 converts (such as de-multiplexes) the serial modulated symbols to parallel data in order to generate N parallel symbol streams, where N is the IFFT/FFT size used in the eNB 102 and the UE 116. The size N IFFT block 215 performs an IFFT operation on the N parallel symbol streams to generate time-domain output signals. The parallel-to-serial block 220 converts (such as multiplexes) the parallel time-domain output symbols from the size N IFFT block 215 in order to generate a serial time-domain signal. The add cyclic prefix block 225 inserts a cyclic prefix to the time-domain signal. The up-converter 230 modulates (such as up-converts) the output of the add cyclic prefix block 225 to an RF frequency for transmission via a wireless channel. The signal may also be filtered at baseband before conversion to the RF frequency.

A transmitted RF signal from the eNB 102 arrives at the UE 116 after passing through the wireless channel, and reverse operations to those at the eNB 102 are performed at the UE 116. The down-converter 255 down-converts the received signal to a baseband frequency, and the remove cyclic prefix block 260 removes the cyclic prefix to generate a serial time-domain baseband signal. The serial-to-parallel block 265 converts the time-domain baseband signal to parallel time domain signals. The size N FFT block 270 performs an FFT algorithm to generate N parallel frequency-domain signals. The parallel-to-serial block 275 converts the parallel frequency-domain signals to a sequence of modulated data symbols. The channel decoding and demodulation block 280 demodulates and decodes the modulated symbols to recover the original input data stream.

Each of the eNBs 101-103 may implement a transmit path 200 that is analogous to transmitting in the downlink to UEs 111-116 and may implement a receive path 250 that is analogous to receiving in the uplink from UEs 111-116. Similarly, each of UEs 111-116 may implement a transmit path 200 for transmitting in the uplink to eNBs 101-103 and may implement a receive path 250 for receiving in the downlink from eNBs 101-103.

Each of the components in FIGS. 2A and 2B can be implemented using only hardware or using a combination of hardware and software/firmware. As a particular example, at least some of the components in FIGS. 2A and 2B may be implemented in software, while other components may be implemented by configurable hardware or a mixture of software and configurable hardware. For instance, the FFT block 270 and the IFFT block 215 may be implemented as configurable software algorithms, where the value of size N may be modified according to the implementation.

Furthermore, although described as using FFT and IFFT, this is by way of illustration only and should not be construed to limit the scope of this disclosure. Other types of transforms, such as Discrete Fourier Transform (DFT) and Inverse Discrete Fourier Transform (IDFT) functions, could be used. It will be appreciated that the value of the variable N may be any integer number (such as 1, 2, 3, 4, or the like) for DFT and IDFT functions, while the value of the variable N may be any integer number that is a power of two (such as 1, 2, 4, 8, 16, or the like) for FFT and IFFT functions.

Although FIGS. 2A and 2B illustrate examples of wireless transmit and receive paths, various changes may be made to FIGS. 2A and 2B. For example, various components in FIGS. 2A and 2B could be combined, further subdivided, or omitted and additional components could be added according to particular needs. Also, FIGS. 2A and 2B are meant to illustrate examples of the types of transmit and receive paths that could be used in a wireless network. Any other suitable architectures could be used to support wireless communications in a wireless network.

Figure 3A:
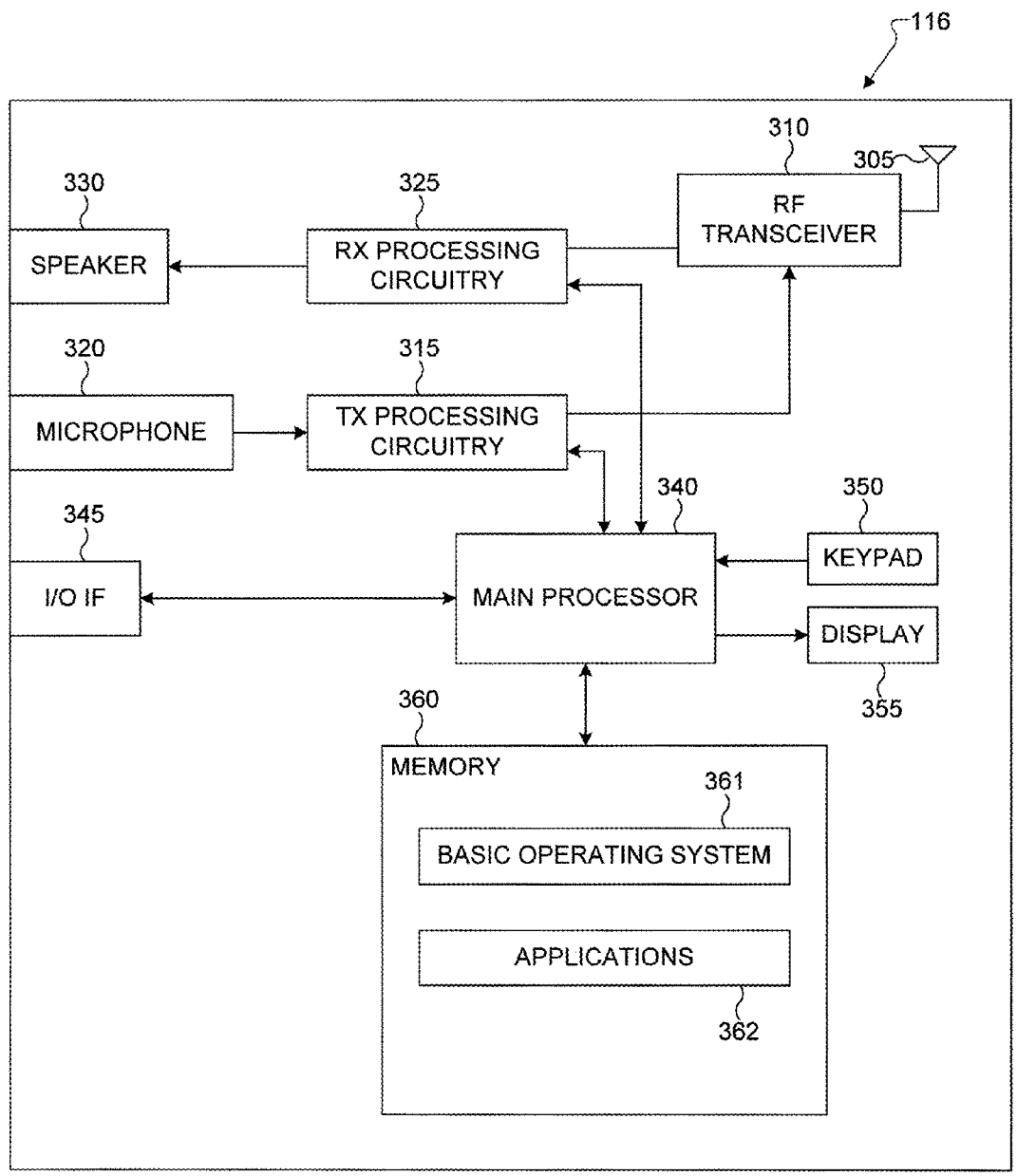
FIG. 3A illustrates an example user equipment according to this disclosure.

FIG. 3A illustrates an example UE 116 according to this disclosure. The embodiment of the UE 116 illustrated in FIG. 3A is for illustration only, and the UEs 111-115 of FIG. 1 could have the same or similar configuration. However, UEs come in a wide variety of configurations, and FIG. 3A does not limit the scope of this disclosure to any particular implementation of a UE.

The UE 116 includes an antenna 305, a radio frequency (RF) transceiver 310, transmit (TX) processing circuitry 315, a microphone 320, and receive (RX) processing circuitry 325. The UE 116 also includes a speaker 330, a main processor 340, an input/output (I/O) interface (IF) 345, a keypad 350, a display 355, and a memory 360. The memory 360 includes a basic operating system (OS) program 361 and one or more applications 362.

The RF transceiver 310 receives, from the antenna 305, an incoming RF signal transmitted by an eNB of the network 100. The RF transceiver 310 down-converts the incoming RF signal to generate an intermediate frequency (IF) or baseband signal. The IF or baseband signal is sent to the RX processing circuitry 325, which generates a processed baseband signal by filtering, decoding, and/or digitizing the baseband or IF signal. The RX processing circuitry 325 transmits the processed baseband signal to the speaker 330 (such as for voice data) or to the main processor 340 for further processing (such as for web browsing data).

The TX processing circuitry 315 receives analog or digital voice data from the microphone 320 or other outgoing baseband data (such as web data, e-mail, or interactive video game data) from the main processor 340. The TX processing circuitry 315 encodes, multiplexes, and/or digitizes the outgoing baseband data to generate a processed baseband or IF signal. The RF transceiver 310 receives the outgoing processed baseband or IF signal from the TX processing circuitry 315 and up-converts the baseband or IF signal to an RF signal that is transmitted via the antenna 305.

The main processor 340 can include one or more processors or other processing devices and execute the basic OS program 361 stored in the memory 360 in order to control the overall operation of the UE 116. For example, the main processor 340 could control the reception of forward channel signals and the transmission of reverse channel signals by the RF transceiver 310, the RX processing circuitry 325, and the TX processing circuitry 315 in accordance with well-known principles. In some embodiments, the main processor 340 includes at least one microprocessor or microcontroller.

The main processor 340 is also capable of executing other processes and programs resident in the memory 360, such as operations for channel quality measurement and reporting for systems having 2D antenna arrays as described in embodiments of the present disclosure as described in embodiments of the present disclosure. The main processor 340 can move data into or out of the memory 360 as required by an executing process. In some embodiments, the main processor 340 is configured to execute the applications 362 based on the OS program 361 or in response to signals received from eNBs or an operator. The main processor 340 is also coupled to the I/O interface 345, which provides the UE 116 with the ability to connect to other devices such as laptop computers and handheld computers. The I/O interface 345 is the communication path between these accessories and the main controller 340.

The main processor 340 is also coupled to the keypad 350 and the display unit 355. The operator of the UE 116 can use the keypad 350 to enter data into the UE 116. The display 355 may be a liquid crystal display or other display capable of rendering text and/or at least limited graphics, such as from web sites.

The memory 360 is coupled to the main processor 340. Part of the memory 360 could include a random access memory (RAM), and another part of the memory 360 could include a Flash memory or other read-only memory (ROM).

Although FIG. 3A illustrates one example of UE 116, various changes may be made to FIG. 3A. For example, various components in FIG. 3A could be combined, further subdivided, or omitted and additional components could be added according to particular needs. As a particular example, the main processor 340 could be divided into multiple processors, such as one or more central processing units (CPUs) and one or more graphics processing units (GPUs). Also, while FIG. 3A illustrates the UE 116 configured as a mobile telephone or smartphone, UEs could be configured to operate as other types of mobile or stationary devices.

Figure 3B:
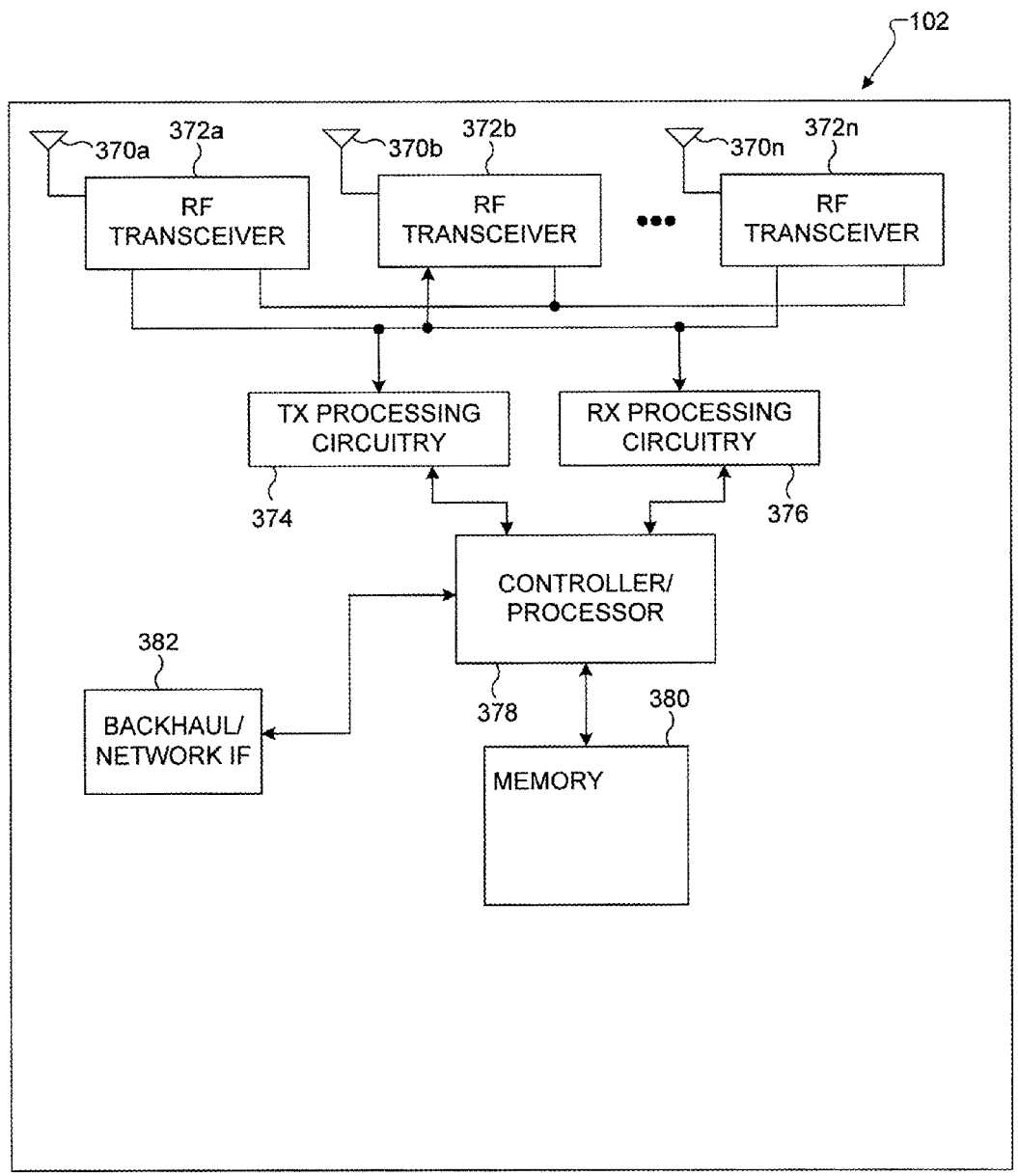
FIG. 3B illustrates an example enhanced NodeB (eNB) according to this disclosure.

FIG. 3B illustrates an example eNB 102 according to this disclosure. The embodiment of the eNB 102 shown in FIG. 3B is for illustration only, and other eNBs of FIG. 1 could have the same or similar configuration. However, eNBs come in a wide variety of configurations, and FIG. 3B does not limit the scope of this disclosure to any particular implementation of an eNB. It is noted that eNB 101 and eNB 103 can include the same or similar structure as eNB 102.

As shown in FIG. 3B, the eNB 102 includes multiple antennas 370a-370n, multiple RF transceivers 372a-372n, transmit (TX) processing circuitry 374, and receive (RX) processing circuitry 376. In certain embodiments, one or more of the multiple antennas 370a-370n include 2D antenna arrays. The eNB 102 also includes a controller/processor 378, a memory 380, and a backhaul or network interface 382.

The RF transceivers 372a-372n receive, from the antennas 370a-370n, incoming RF signals, such as signals transmitted by UEs or other eNBs. The RF transceivers 372a-372n down-convert the incoming RF signals to generate IF or baseband signals. The IF or baseband signals are sent to the RX processing circuitry 376, which generates processed baseband signals by filtering, decoding, and/or digitizing the baseband or IF signals. The RX processing circuitry 376 transmits the processed baseband signals to the controller/processor 378 for further processing.

The TX processing circuitry 374 receives analog or digital data (such as voice data, web data, e-mail, or interactive video game data) from the controller/processor 378. The TX processing circuitry 374 encodes, multiplexes, and/or digitizes the outgoing baseband data to generate processed baseband or IF signals. The RF transceivers 372a-372n receive the outgoing processed baseband or IF signals from the TX processing circuitry 374 and up-converts the baseband or IF signals to RF signals that are transmitted via the antennas 370a-370n.

The controller/processor 378 can include one or more processors or other processing devices that control the overall operation of the eNB 102. For example, the controller/processor 378 could control the reception of forward channel signals and the transmission of reverse channel signals by the RF transceivers 372a-372n, the RX processing circuitry 376, and the TX processing circuitry 324 in accordance with well-known principles. The controller/processor 378 could support additional functions as well, such as more advanced wireless communication functions. For instance, the controller/processor 378 can perform the blind interference sensing (BIS) process, such as performed by a BIS algorithm, and decodes the received signal subtracted by the interfering signals. Any of a wide variety of other functions could be supported in the eNB 102 by the controller/processor 378. In some embodiments, the controller/processor 378 includes at least one microprocessor or microcontroller.

The controller/processor 378 is also capable of executing programs and other processes resident in the memory 380, such as a basic OS. The controller/processor 378 is also capable of supporting channel quality measurement and reporting for systems having 2D antenna arrays as described in embodiments of the present disclosure. In some embodiments, the controller/processor 378 supports communications between entities, such as web RTC. The controller/processor 378 can move data into or out of the memory 380 as required by an executing process.

The controller/processor 378 is also coupled to the backhaul or network interface 335. The backhaul or network interface 382 allows the eNB 102 to communicate with other devices or systems over a backhaul connection or over a network. The interface 382 could support communications over any suitable wired or wireless connection(s). For example, when the eNB 102 is implemented as part of a cellular communication system (such as one supporting 5G, LTE, or LTE-A), the interface 382 could allow the eNB 102 to communicate with other eNBs over a wired or wireless backhaul connection. When the eNB 102 is implemented as an access point, the interface 382 could allow the eNB 102 to communicate over a wired or wireless local area network or over a wired or wireless connection to a larger network (such as the Internet). The interface 382 includes any suitable structure supporting communications over a wired or wireless connection, such as an Ethernet or RF transceiver.

The memory 380 is coupled to the controller/processor 325. Part of the memory 330 could include a RAM, and another part of the memory 380 could include a Flash memory or other ROM. In certain embodiments, a plurality of instructions, such as a BIS algorithm is stored in memory. The plurality of instructions are configured to cause the controller/processor 378 to perform the BIS process and to decode a received signal after subtracting out at least one interfering signal determined by the BIS algorithm.

As described in more detail below, the transmit and receive paths of the eNB 102 (implemented using the RF transceivers 372a-372n, TX processing circuitry 374, and/or RX processing circuitry 376) support communication with aggregation of FDD cells and TDD cells.

Although FIG. 3B illustrates one example of an eNB 102, various changes may be made to FIG. 3B. For example, the eNB 102 could include any number of each component shown in FIG. 3. As a particular example, an access point could include a number of interfaces 382, and the controller/processor 378 could support routing functions to route data between different network addresses. As another particular example, while shown as including a single instance of TX processing circuitry 374 and a single instance of RX processing circuitry 376, the eNB 102 could include multiple instances of each (such as one per RF transceiver).

Figure 4:
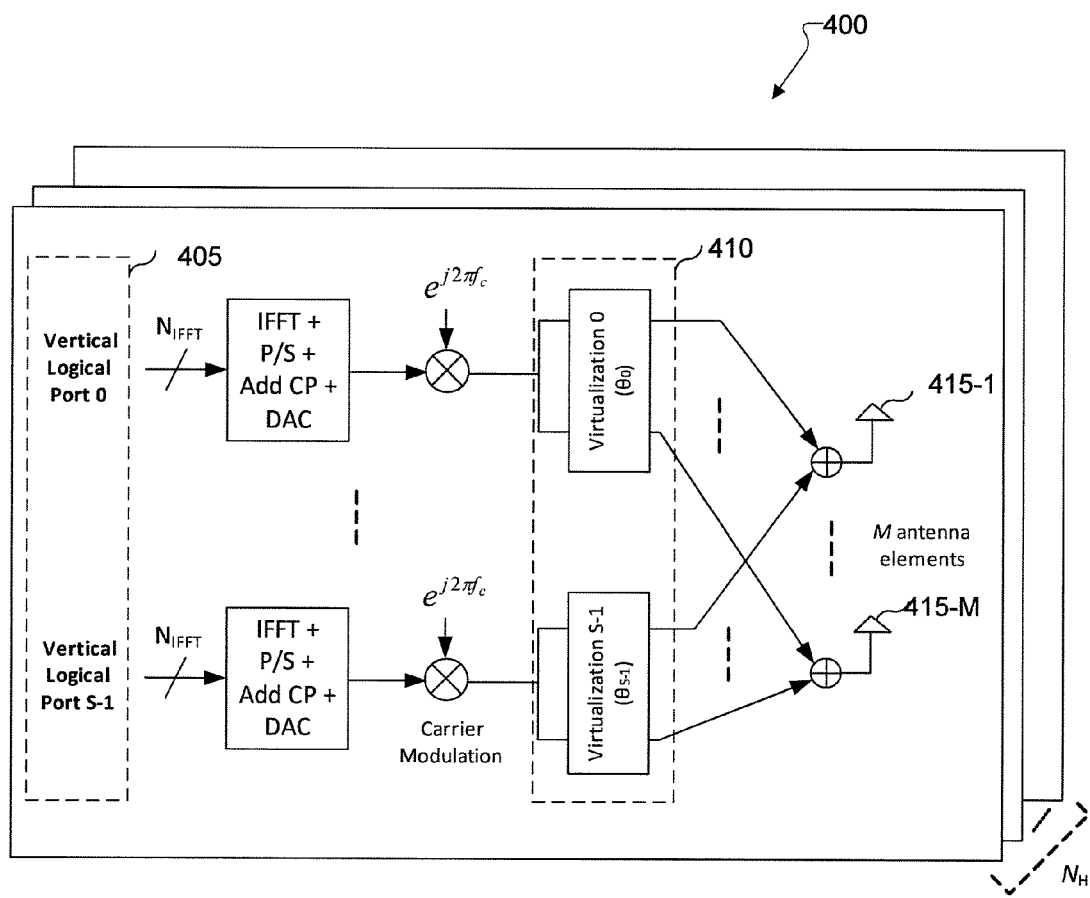
FIG. 4 illustrates the logical port to antenna port mapping according to this disclosure.

FIG. 4 illustrates the logical port to antenna port mapping 400 according to some embodiments of the present disclosure. The embodiment shown in FIG. 4 is for illustration only. Other embodiments could be used without departing from the scope of the present disclosure.

In the example shown in FIG. 4, Tx signals on each logical port 405 is fed into an antenna virtualization matrix 410 (e.g., of a size M×1), output signals of which are into a set of M physical antenna ports 415-1 to 415-M. In some embodiments, M corresponds to a total number of antenna elements on a substantially vertical axis. In some embodiments, M corresponds to a ratio of a total number of antenna elements to S, on a substantially vertical axis, wherein M and S are chosen to be a positive integer.

Figure 5A:
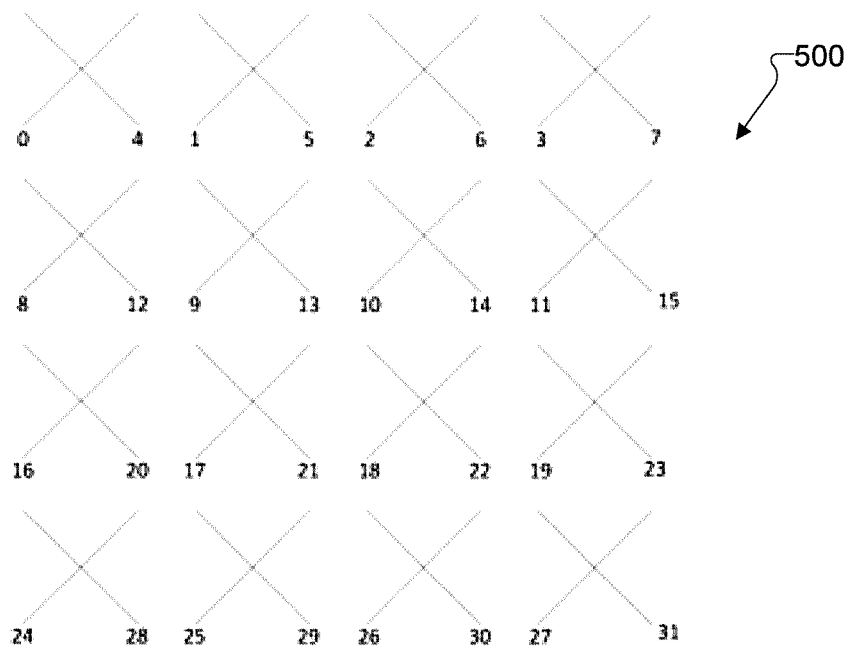
FIGS. 5A and 5B illustrate example 2D antenna arrays comprising 16 dual-polarized antenna elements according to this disclosure.
Figure 5B:
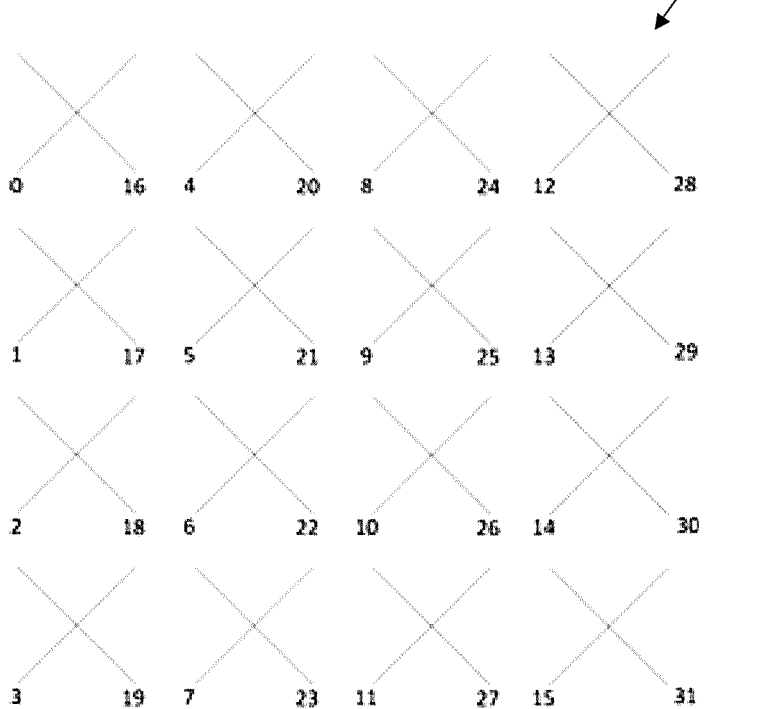

FIGS. 5A and 5B illustrate example 2D antenna arrays that are constructed from 16 dual-polarized antenna elements arranged in a 4×4 rectangular format according to embodiments of the present disclosure. FIG. 5A illustrates a 4×4 dual-polarized antenna array with antenna port (AP) indexing 1 500, and FIG. 5B is the same 4×4 dual-polarized antenna array 510 with antenna port indexing (AP) indexing 2. The embodiment shown in FIGS. 5A and 5B are for illustration only. Other embodiments could be used without departing from the scope of the present disclosure.

In certain embodiments, each labelled antenna element is logically mapped onto a single antenna port. In general, one antenna port may correspond to multiple antenna elements (physical antennas) combined via a virtualization. This 4×4 dual polarized array can then be viewed as 16×2=32-element array of elements. The vertical dimension (consisting of 4 rows) facilitates elevation beamforming in addition to the azimuthal beamforming across the horizontal dimension (consisting of 4 columns of dual polarized antennas). MIMO precoding in Rel.12 LTE standardization (per TS36.211 sections 6.3.4.2 and 6.3.4.4; and TS36.213 section 7.2.4) was largely designed to offer a precoding gain for one-dimensional antenna array. While fixed beamforming (i.e. antenna virtualization) can be implemented across the elevation dimension, it is unable to reap the potential gain offered by the spatial and frequency selective nature of the channel.

Figure 6:
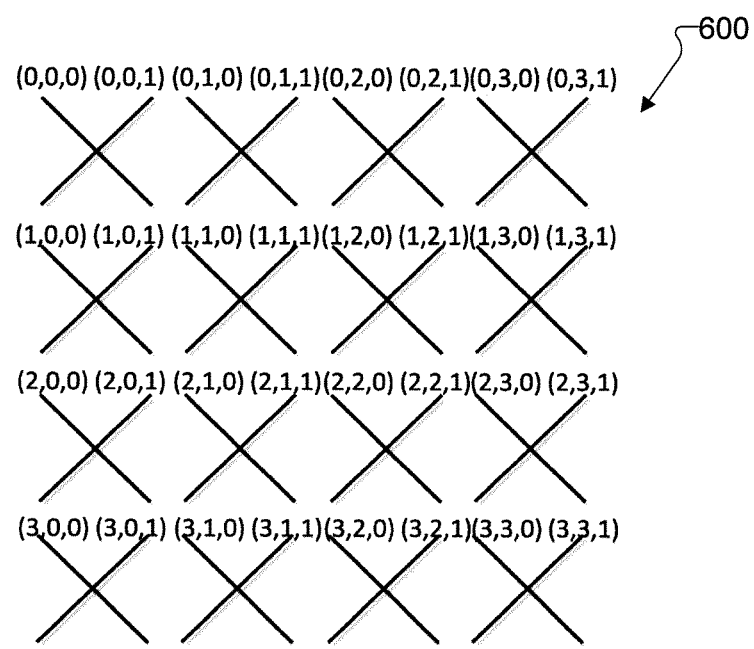
FIG. 6 illustrates another numbering of TX antenna elements according to this disclosure.

FIG. 6 illustrates another numbering of TX antenna elements 600 (or TXRU) according to embodiments of the present disclosure. The embodiment shown in FIG. 6 is for illustration only. Other embodiments could be used without departing from the scope of the present disclosure.

In certain embodiments, eNB is equipped with 2D rectangular antenna array (or TXRUs), comprising M rows and N columns with P=2 polarized, wherein each element (or TXRU) is indexed with (m, n, p), and m=0, . . . , M−1, n=0, . . . , N−1, p=0, . . . , P−1, as illustrated in FIG. 6 with M=N=4. When the example shown in FIG. 6 represents a TXRU array, a TXRU can be associated with multiple antenna elements. In one example (1-dimensional (1D) subarray partition), an antenna array comprising a column with a same polarization of a 2D rectangular array is partitioned into M groups of consecutive elements, and the M groups correspond to the M TXRUs in a column with a same polarization in the TXRU array in FIG. 6.

In some embodiments, a UE is configured with a CSI-RS resource comprising Q=MNP number of CSI-RS ports, wherein the CSI-RS resource is associated with MNP number of resource elements (REs) in a pair of PRBs in a subframe.

CSI-RS and CSI Feedback Configuration

In some embodiments, a UE is configured with a CSI-RS configuration via higher layer, configuring Q antenna ports—antenna ports A(1) through A(Q). The UE 116 is further configured with CSI reporting configuration via higher layer in association with the CSI-RS configuration. The CSI reporting configuration includes information element (IE) indicating the CSI-RS decomposition information (or component PMI port configuration). The information element may comprise at least two integers, say $N_1$ and $N_2$, which respectively indicates a first number of antenna ports, and a second number of antenna ports, wherein $Q=N_1 \cdot N_2$.

One example method of indicating the CSI-RS decomposition (or component PMI port configuration) is described below TABLE 1:

TABLE 1

| | |
|---|---|
| CSIRS decomposition information or Component PMI port configuration | When N = 8, $(N_1, N_2) \in \{(2, 4), (4, 2)\}$.<br>When N = 16, $(N_1, N_2) \in \{(2, 8), (4, 4), (8, 2)\}$.<br>When N = 32, $(N_1, N_2) \in \{(8, 4), (4, 8)\}$. |

Another example method of indicating the PMI reporting decomposition is to explicitly configure N and $N_1$, and implicitly configure $N_2$ as described below TABLE 2:

TABLE 2

| | |
|---|---|
| Component PMI port configuration | Q . . . positive even number,<br>e.g., selected from $\{1, 2, 4, \ldots, 32\}$<br>$N_1$ . . . positive even number,<br>e.g., selected from $\{1, 2, 4, \ldots, 16\}$<br>$N_2 = Q/N_1$ . . . implicitly derived out of explicitly configured N and $N_1$. |

Another example method of indicating the PMI reporting decomposition is to explicitly configure $N_1$ and $N_2$, and implicitly configure N as described below TABLE 3:

TABLE 3

| | |
|---|---|
| Component PMI port configuration | $N_1$ . . . positive even number,<br>e.g., selected from $\{1, 2, 4, \ldots, 16\}$<br>$N_2$ . . . positive even number,<br>e.g., selected from $\{1, 2, 4, \ldots, 16\}$<br>$Q = N_1 \cdot N_2$ . . . implicitly derived out of explicitly configured $N_1$ and $N_2$. |

Another example method of indicating the PMI reporting decomposition is to explicitly configure M, N, and P, and implicitly configure N as described below TABLE 4:

TABLE 4

| | |
|---|---|
| Component PMI port configuration | M . . . positive even number,<br>e.g., selected from $\{1, 2, 4, \ldots, 16\}$<br>N . . . positive even number,<br>e.g., selected from $\{1, 2, 4, \ldots, 16\}$<br>P . . . either 1 or 2<br>$Q = M \cdot N \cdot P$ . . . implicitly derived out of explicitly configured M, N, and P. |

When the UE 116 is configured with $(N_1, N_2)$, the UE 116 calculates CQI with a composite precoder constructed with two-component codebooks, $N_1$-Tx codebook (codebook 1) and $N_2$-Tx codebook (codebook 2). When $W_1$ and $W_2$ are respectively are precoders of codebook 1 and codebook 2, the composite precoder (of size P×(rank)) is the (column-wise) Kronecker product of the two, $W = W_1 \otimes W_2$. If PMI reporting is configured, the UE 116 will report at least two component PMI corresponding to selected pair of $W_1$ and $W_2$.

In one method, either $W_1$ or $W_2$ is further decomposed according to the double codebook structure. For example, $W_1$ is further decomposed into:

$$W_1(n, m) = \frac{1}{p_1} \begin{bmatrix} v_m \\ \varphi_n v_m \end{bmatrix}$$

if rank 1; and $$W_1(n, m, m') = \frac{1}{p_2} \begin{bmatrix} v_m & v_{m'} \\ \varphi_n v_m & -\varphi_n v_{m'} \end{bmatrix}$$

if rank 2, wherein $p_1$ and $p_2$ are normalization factors to make total transmission power 1, $v_m$ is an m-th DFT vector out of a $(N_1/2)$-Tx DFT codebook with oversampling factor $o_1$, and $\varphi_{n,n}$ is a co-phase. Furthermore, the index m, m', n determines the precoder $W_1$.

If the transmission rank is one (or number of transmission layers is one), then CQI will be derived with $$W = W_1 \otimes W_2 = \frac{1}{p_1} \begin{bmatrix} v_m \otimes W_2 \\ \varphi_n v_m \otimes W_2 \end{bmatrix};$$

and if the transmission rank is two, then CQI will be derived with $$W = W_1 \otimes W_2 |_{columnwiseKP} = \frac{1}{p_2} \begin{bmatrix} v_m \otimes W_2 & v_{m'} \otimes W_2 \\ \varphi_n v_m \otimes W_2 & -\varphi_n v_{m'} \otimes W_2 \end{bmatrix}.$$

In one example of this method, $N_1 = 8$ and $N_2 = 4$, and the TXRUs (or the antenna ports) are numbered according to FIG. 5B. In this case, $W_1$ is further decomposed into:

$$W_1(n, m) = \frac{1}{p_1} \begin{bmatrix} v_m \\ \varphi_n v_m \end{bmatrix}$$

if rank 1; and $$W_1(n, m, m') = \frac{1}{p_2}\begin{bmatrix} v_m & v_{m'} \\ \varphi_n v_m & -\varphi_n v_{m'} \end{bmatrix}$$

if rank 2, wherein $v_m$ is an m-th DFT vector out of a 4-Tx DFT codebook with oversampling factor 8; and $$\varphi_n = e^{j\frac{2\pi n}{4}}.$$

Furthermore, with one transmission layer, CQI will be derived with precoder $$W = W_1 \otimes W_2 = \frac{1}{\sqrt{8}}\begin{bmatrix} v_m \otimes W_2 \\ \varphi_n v_m \otimes W_2 \end{bmatrix};$$

and with two transmission layer, CQI will be derived with precoder:

$$W = W_1 \otimes W_2 |_{column-wise KP} = \frac{1}{4}\begin{bmatrix} v_m \otimes W_2 & v_{m'} \otimes W_2 \\ \varphi_n v_m \otimes W_2 & -\varphi_n v_{m'} \otimes W_2 \end{bmatrix}. \quad (1)$$

In certain embodiments, UE 116 is configured with a CSI-RS configuration via higher layer, configuring two resources, wherein a first resource is used for CSI-RS transmissions of $N_1$ antenna ports—antenna ports $A(1)$ through $A(N_1)$, and a second resource is used for CSI-RS transmissions of $N_2$ antenna ports—antenna ports $B(1)$ through $B(N_2)$.

When the UE 116 is configured with $(N_1, N_2)$, the UE 116 calculates CQI with a composite precoder constructed with two-component codebooks, $N_1$-Tx codebook (codebook 1) and $N_2$-Tx codebook (codebook 2). When $W_1$ and $W_2$ are respectively are precoders of codebook 1 and codebook 2, the composite precoder (of size P×(rank), wherein $P=N_1 \cdot N_2$) is the Kronecker product of the two, $W=W_1 \otimes W_2$. If PMI reporting is configured, the UE 116 will report two component PMI corresponding to selected pair of $W_1$ and $W_2$. The signals formed with the composite precoder is assumed to be transmitted on antenna ports $C(1), \ldots, C(P)$ for the purpose of deriving CQI index. In certain embodiments, the UE 116 is configured to also assume that reference signals on antenna ports $C(1), \ldots, C(P)$ are constructed by a Kronecker product of reference signals on $A(1), \ldots, A(N_1)$ and reference signals on $B(1), \ldots, B(N_2)$. In other words:

$$[C(1), \ldots, C(P)]^t = [A(1), \ldots, A(N_1)]^t \otimes [B(1), \ldots, B(N_2)]^t. \quad (2)$$

Relation of Composite Precoder to Antenna Ports

In certain embodiments, for the purpose of deriving CQI index, and PMI and RI (if configured), the UE may assume the following:

The PDSCH signals on antenna ports $\{7, \ldots, 6+\upsilon\}$ would result in signals equivalent to corresponding symbols transmitted on antenna ports $\{15, \ldots, 14+P\}$, as given by $$\begin{bmatrix} y^{(15)}(i) \\ \vdots \\ y^{(14+P)}(i) \end{bmatrix} = W(i) \begin{bmatrix} x^{(0)}(i) \\ \vdots \\ x^{(\upsilon-1)}(i) \end{bmatrix},$$

where $$x(i) = [x^{(0)}(i) \ldots x^{(\upsilon-1)}(i)]^T$$

is a vector of symbols from the layer mapping in sub-clause 6.3.3.2 of 3GPP TS 36.211, P is the number of antenna ports of the associated CSI-RS resource, and if P=1, W(i) is 1, otherwise W(i), of size P×$\upsilon$, is the precoding matrix corresponding to the reported PMI applicable to x(i). The corresponding PDSCH signals transmitted on antenna ports $\{15 \ldots 14+P\}$ would have a ratio of EPRE to CSI-RS EPRE equal to the ratio given in sub-clause 3GPP TS 36.213.

8-Tx Double Codebook

TABLE 5 and TABLE 6 are codebooks for rank-1 and rank-2 (1-layer and 2-layer) CSI reporting for UEs configured with 8 Tx antenna port transmissions. To determine a CW for each codebook, two indices, i.e., $i_1$ and $i_2$ have to be selected. In these precoder expressions, the following two variables are used:

$$\varphi_n = e^{j\pi n/2} \quad (3)$$
$$v_m = [1 \quad e^{j2\pi m/32} \quad e^{j4\pi m/32} \quad e^{j6\pi m/32}]^T.$$

TABLE 5

Codebook for 1-layer CSI reporting using antenna ports 15 to 22

| $i_1$ | $i_2$ | | | | | | | |
|---|---|---|---|---|---|---|---|---|
|  | 0 | 1 | 2 | 3 | 4 | 5 | 6 | 7 |
| 0–15 | $W_{2i_1,0}^{(1)}$ | $W_{2i_1,1}^{(1)}$ | $W_{2i_1,2}^{(1)}$ | $W_{2i_1,3}^{(1)}$ | $W_{2i_1+1,0}^{(1)}$ | $W_{2i_1+1,1}^{(1)}$ | $W_{2i_1+1,2}^{(1)}$ | $W_{2i_1+1,3}^{(1)}$ |

| $i_1$ | $i_2$ | | | | | | | |
|---|---|---|---|---|---|---|---|---|
|  | 8 | 9 | 10 | 11 | 12 | 13 | 14 | 15 |
| 0–15 | $W_{2i_1+2,0}^{(1)}$ | $W_{2i_1+2,1}^{(1)}$ | $W_{2i_1+2,2}^{(1)}$ | $W_{2i_1+2,3}^{(1)}$ | $W_{2i_1+3,0}^{(1)}$ | $W_{2i_1+3,1}^{(1)}$ | $W_{2i_1+3,2}^{(1)}$ | $W_{2i_1+3,3}^{(1)}$ | where $$W_{m,n}^{(1)} = \frac{1}{\sqrt{8}}\begin{bmatrix} v_m \\ \varphi_n v_m \end{bmatrix},$$

If the most recently reported RI=1, m and n are derived with the two indices $i_1$ and $i_2$ according to TABLE 5, resulting in a rank-1 precoder, $$W_{m,n}^{(1)} = \frac{1}{\sqrt{8}}\begin{bmatrix} v_m \\ \varphi_n v_m \end{bmatrix}.$$

TABLE 6

Codebook for 2-layer CSI reporting using antenna ports 15 to 22

| $i_1$ | $i_2$ | | | | | | | |
|---|---|---|---|---|---|---|---|---|
| | 0 | 1 | 2 | 3 | 4 | 5 | 6 | 7 |
| 0-15 | $W_{2i_1,2i_1,0}^{(2)}$ | $W_{2i_1,2i_1,1}^{(2)}$ | $W_{2i_1+1,2i_1+1,0}^{(2)}$ | $W_{2i_1+1,2i_1+1,1}^{(2)}$ | $W_{2i_1+2,2i_1+2,0}^{(2)}$ | $W_{2i_1+2,2i_1+2,1}^{(2)}$ | $W_{2i_1+3,2i_1+3,0}^{(2)}$ | $W_{2i_1+3,2i_1+3,1}^{(2)}$ |

| $i_1$ | $i_2$ | | | | | | | |
|---|---|---|---|---|---|---|---|---|
| | 8 | 9 | 10 | 11 | 12 | 13 | 14 | 15 |
| 0-15 | $W_{2i_1,2i_1+1,0}^{(2)}$ | $W_{2i_1,2i_1+1,1}^{(2)}$ | $W_{2i_1+1,2i_1+2,0}^{(2)}$ | $W_{2i_1+1,2i_1+2,1}^{(2)}$ | $W_{2i_1,2i_1+3,0}^{(2)}$ | $W_{2i_1,2i_1+3,1}^{(2)}$ | $W_{2i_1+1,2i_1+3,0}^{(2)}$ | $W_{2i_1+1,2i_1+3,1}^{(2)}$ | where $$W_{m,m',n}^{(2)} = \frac{1}{4}\begin{bmatrix} v_m & v_{m'} \\ \varphi_n v_m & -\varphi_n v_{m'} \end{bmatrix}$$

If the most recently reported RI=2, m, m' and n are derived with the two indices $i_1$ and $i_2$ according to TABLE 6, resulting in a rank-2 precoder, $$W_{m,m',n}^{(2)} = \frac{1}{4}\begin{bmatrix} v_m & v_{m'} \\ \varphi_n v_m & -\varphi_n v_{m'} \end{bmatrix}.$$

It is noted that $W_{m,m',n}^{(2)}$ is constructed such that it can be used for two different types of channel conditions that facilitate a rank-2 transmission.

One subset of the codebook associated with $i_2=\{0, 1, \ldots, 7\}$ comprises codewords with m=m', or the same beams ($v_m$) are used for constructing the rank-2 precoder:

$$W_{m,m,n}^{(2)} = \frac{1}{4}\begin{bmatrix} v_m & v_m \\ \varphi_n v_m & -\varphi_n v_m \end{bmatrix}.$$

In this case, the two columns in the 2-layer precoder are orthogonal (i.e., $$[v_m \; \varphi_n v_m]^H \cdot [v_m \; -\varphi_n v_m] = 0),$$

owing to the different signs applied to $\varphi_n$ for the two columns. These rank-2 precoders are likely to be used for those UEs that can receive strong signals along two orthogonal channels generated by the two differently polarized antennas.

Figure 7:
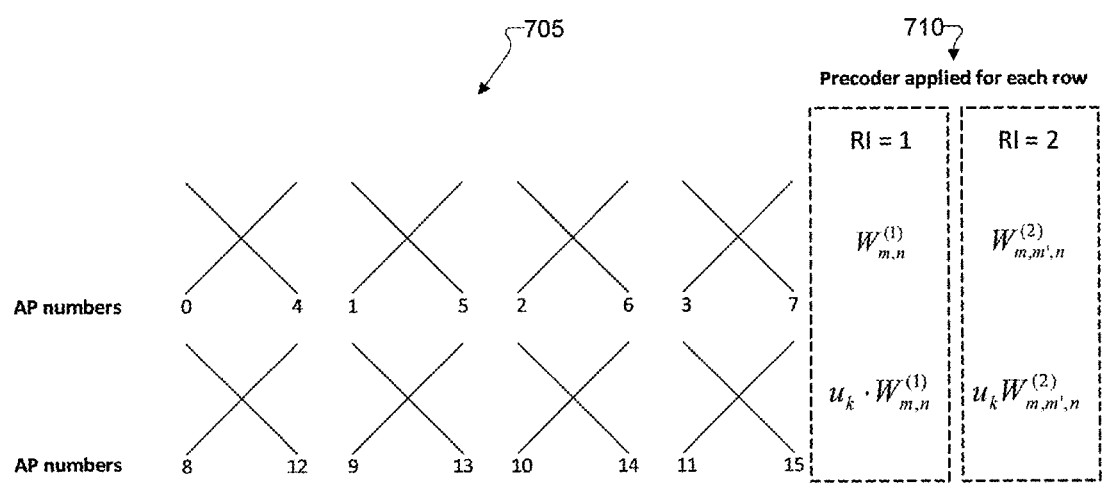
FIG. 7 illustrates a codebook construction constructed for P=16 antenna ports according to this disclosure.

FIG. 7 illustrates a codebook construction 710 constructed for P=16 antenna ports according to embodiments of the present disclosure. The embodiment shown in FIG. 7 is for illustration only. Other embodiments could be used without departing from the scope of the present disclosure.

In the example shown in FIG. 7, P=16 antenna ports 705 comprise $N_1=8$ and $N_2=2$. Here, $N_1$ represents a number of APs in a first (horizontal or vertical) dimension and $N_2$ represents a number of in-line antenna rows in a second (vertical or horizontal) dimension. For each group of APs corresponding to each row (i.e., $\{0, 1, \ldots, 7\}$ and $\{8, 9, \ldots, 15\}$), the channels are quantized with two indices $i_1$ and $i_2$, according to the 8-Tx double codebook. It is noted that the antenna (TXRU) numbering system in this example is aligned with FIG. 5A.

A co-phasing vector to apply for the two rows is constructed with a new index k, and is equal to $$V_k^{(1)} = \begin{bmatrix} 1 \\ u_k \end{bmatrix}.$$

The resulting precoders $W_{m,n,k}^{(1)}$ and $W_{m,m'n,k}^{(1)}$ when the most recently reported RI is 1 and 2 are:

$$W_{m,n,k}^{(1)} = \frac{1}{\sqrt{2}}\begin{bmatrix} W_{m,n}^{(1)} \\ u_k W_{m,n}^{(1)} \end{bmatrix} \text{ if } RI = 1; \quad (4)$$

$$W_{m,m',n,k}^{(2)} = \frac{1}{\sqrt{2}}\begin{bmatrix} W_{m,m',n}^{(2)} \\ u_k W_{m,m',n}^{(2)} \end{bmatrix} \text{ if } RI = 2. \quad (5)$$

It is noted that the precoders when the most recently reported RI is >2 can also be similarly constructed with applying a co-phasing vector.

Case 1. (RI=1)

Substituting $$W_{m,n}^{(1)} = \frac{1}{\sqrt{8}}\begin{bmatrix} v_m \\ \varphi_n v_m \end{bmatrix}$$

to $$W_{m,n,k}^{(1)} = \frac{1}{\sqrt{2}}\begin{bmatrix} W_{m,n}^{(1)} \\ u_k W_{m,n}^{(1)} \end{bmatrix},$$

it is as follows:

$$W^{(1)}_{m,n,k}(=V^{(1)}_k \otimes W^{(1)}_{m,n}) = \frac{1}{\sqrt{2}}\begin{bmatrix} W^{(1)}_{m,n} \\ u_k W^{(1)}_{m,n} \end{bmatrix} = \frac{1}{4}\begin{bmatrix} v_m \\ \varphi_n v_m \\ u_k v_m \\ \varphi_n u_k v_m \end{bmatrix}. \quad (6)$$

Case 2. (RI=2)
Substituting $$W^{(2)}_{m,m',n} = \frac{1}{4}\begin{bmatrix} v_m & v_{m'} \\ \varphi_n v_m & -\varphi_n v_{m'} \end{bmatrix}$$

to $$W^{(2)}_{m,m',n,k} = \frac{1}{\sqrt{2}}\begin{bmatrix} W^{(2)}_{m,m',n} \\ u_k W^{(2)}_{m,m',n} \end{bmatrix},$$

it is as follows:

$$W^{(2)}_{m,m',n,k}(=V^{(1)}_k \otimes W^{(2)}_{m,m',n}) = \quad (7)$$

$$\frac{1}{\sqrt{2}}\begin{bmatrix} W^{(2)}_{m,m',n} \\ u_k W^{(2)}_{m,m',n} \end{bmatrix} = \frac{1}{\sqrt{32}}\begin{bmatrix} v_m & v_{m'} \\ \varphi_n v_m & -\varphi_n v_{m'} \\ u_k v_m & u_k v_{m'} \\ \varphi_n u_k v_m & -\varphi_n u_k v_{m'} \end{bmatrix},$$

where it is clarified that $W^{(2)}_{m,m',n,k}$ is indeed a Kronecker product of $V^{(1)}_k$ and $W^{(2)}_{m,m'n}$.

In one method, $u_k = e^{j\pi k/2}$, k=0, 1, 2, 3, which is uniformly sampling the range of $[0, 2\pi]$. In this case, the rank-1 and rank-2 precoders are constructed as:

$$W^{(1)}_{m,n,k} = \frac{1}{4}\begin{bmatrix} v_m \\ e^{\frac{j\pi n}{2}} v_m \\ e^{\frac{j\pi k}{2}} v_m \\ e^{\frac{j\pi(n+k)}{2}} v_m \end{bmatrix} \text{ and} \quad (8)$$

$$W^{(2)}_{m,m',n,k} = \frac{1}{\sqrt{32}}\begin{bmatrix} v_m & v_{m'} \\ e^{\frac{j\pi n}{2}} v_m & -e^{\frac{j\pi n}{2}} v_{m'} \\ e^{\frac{j\pi k}{2}} v_m & e^{\frac{j\pi k}{2}} v_{m'} \\ e^{\frac{j\pi(n+k)}{2}} v_m & -e^{\frac{j\pi(n+k)}{2}} v_{m'} \end{bmatrix}.$$

In another method, $u_k = e^{j\pi k/4}$, k=0, 1, 2, 3, which is uniformly sampling the range of $[0, \pi]$. This method is motivated by the fact that it would be sufficient to consider the range of $[0, \pi]$ for quantizing the elevation (or zenith) angle, when azimuth angle spans $[0, 2\pi]$ In this case, the rank-1 and rank-2 precoders are constructed as:

$$W^{(1)}_{m,n,k} = \frac{1}{4}\begin{bmatrix} v_m \\ e^{\frac{j\pi n}{2}} v_m \\ e^{\frac{j\pi k}{4}} v_m \\ e^{\frac{j\pi(2n+k)}{4}} v_m \end{bmatrix} \text{ and} \quad (9)$$

$$W^{(2)}_{m,m',n,k} = \frac{1}{\sqrt{32}}\begin{bmatrix} v_m & v_{m'} \\ e^{\frac{j\pi n}{2}} v_m & -e^{\frac{j\pi n}{2}} v_{m'} \\ e^{\frac{j\pi k}{4}} v_m & e^{\frac{j\pi k}{4}} v_{m'} \\ e^{\frac{j\pi(2n+k)}{4}} v_m & -e^{\frac{j\pi(2n+k)}{4}} v_{m'} \end{bmatrix}.$$

Figure 8:
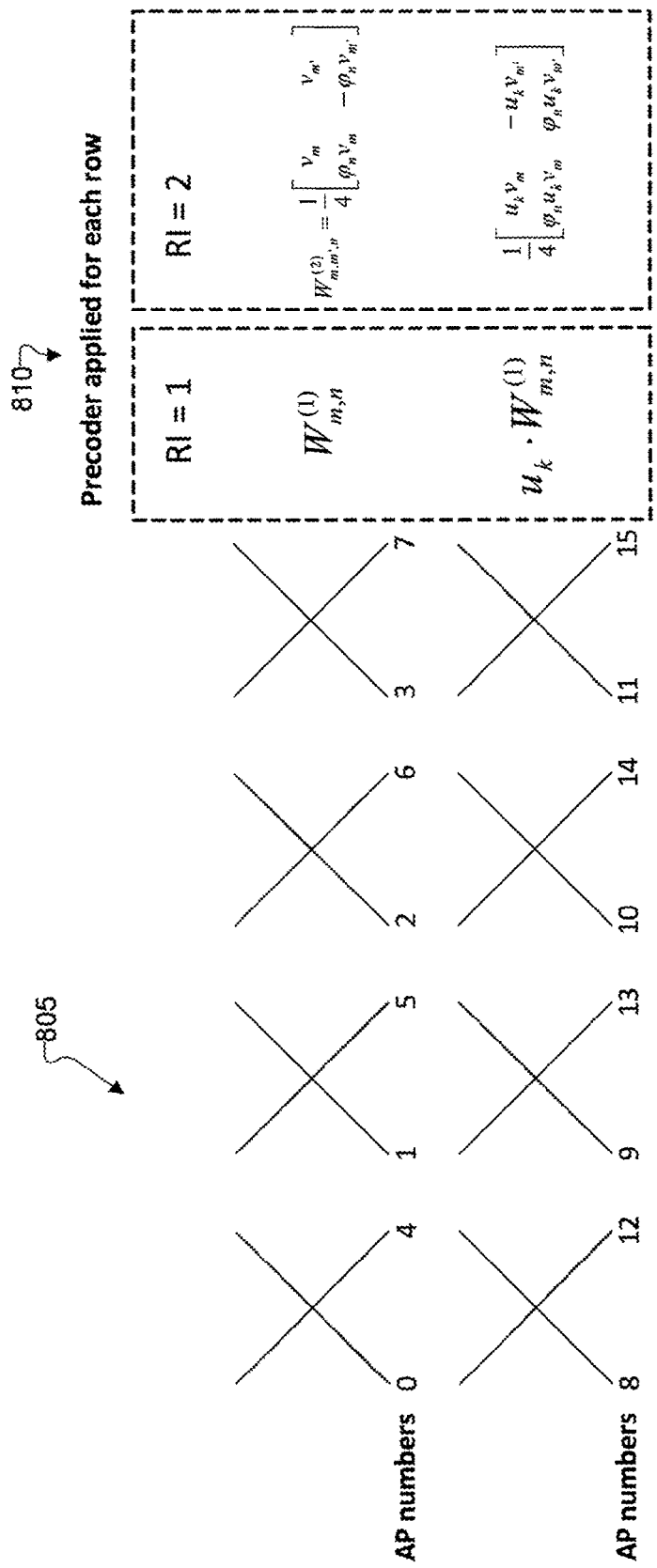
FIG. 8 illustrates another codebook construction for P=16 antenna ports according to this disclosure.

FIG. 8 illustrates another codebook construction 810 for P=16 antenna ports according to embodiments of the present disclosure. The embodiment shown in FIG. 8 is for illustration only. Other embodiments could be used without departing from the scope of the present disclosure.

The codebook construction is the same as that of FIG. 7, except for the second column of the composite 16-Tx rank-2 precoder. According to this construction, the rank-2 precoder matrix is:

$$W^{(2)}_{m,m',n,k} = \quad (10)$$

$$\frac{1}{\sqrt{2}}\begin{bmatrix} \frac{1}{4}\begin{bmatrix} v_m & v_{m'} \\ \varphi_n v_m & -\varphi_n v_{m'} \end{bmatrix} \\ \frac{1}{4}\begin{bmatrix} u_k v_m & -u_k v_{m'} \\ \varphi_n u_k v_m & \varphi_n u_k v_{m'} \end{bmatrix} \end{bmatrix} = \frac{1}{\sqrt{32}}\begin{bmatrix} v_m & v_{m'} \\ \varphi_n v_m & -\varphi_n v_{m'} \\ u_k v_m & -u_k v_{m'} \\ \varphi_n u_k v_m & \varphi_n u_k v_{m'} \end{bmatrix},$$

where $u_k = e^{j\pi k/2}$, k=0, 1, 2, 3 or $u_k = e^{j\pi k/4}$, k=0, 1, 2, 3.

Figure 9:
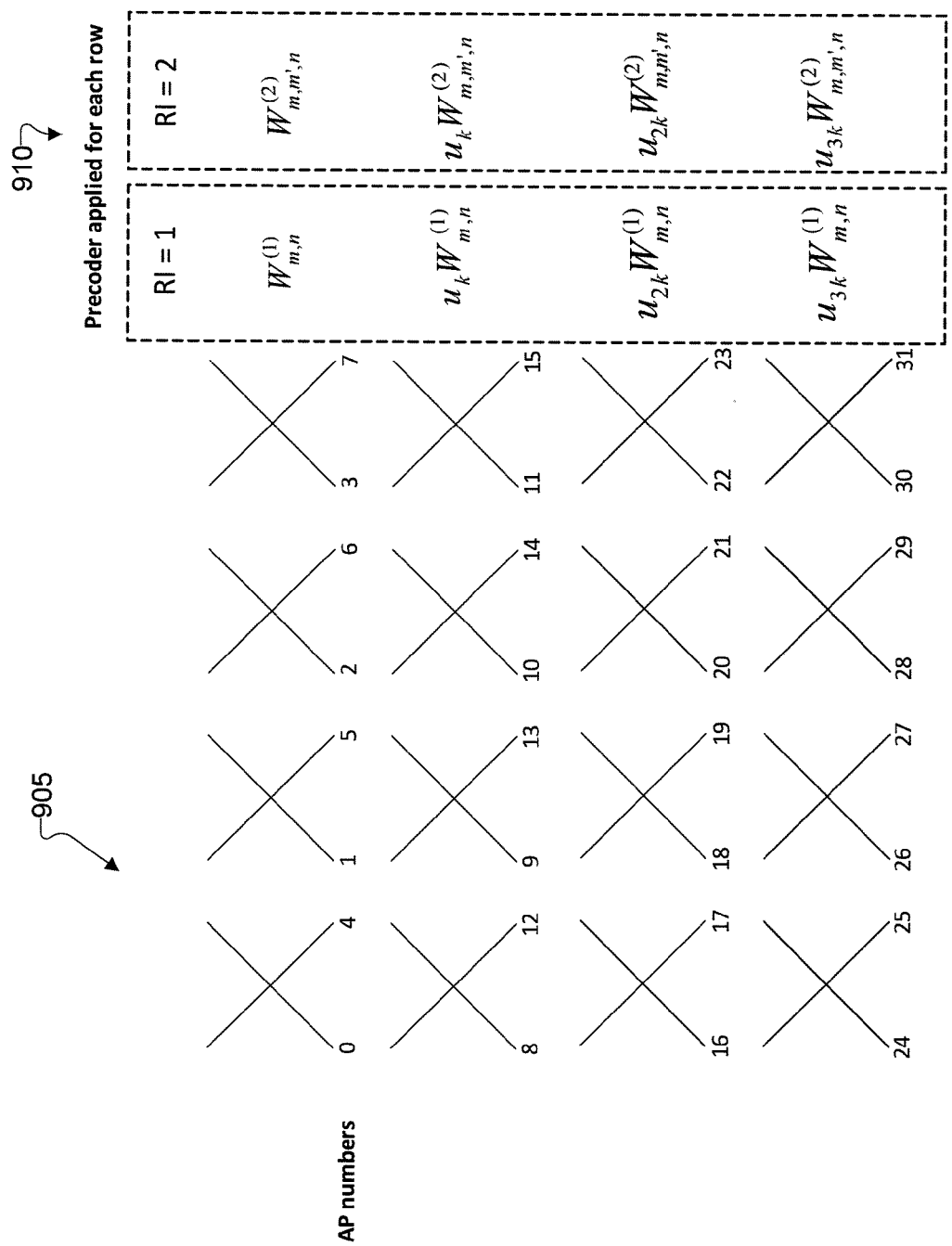
FIG. 9 illustrates a codebook construction for P=32 antenna ports according to this disclosure.

FIG. 9 illustrates a codebook construction 910 for P=32 antenna ports according to embodiments of the present disclosure. The embodiment shown in FIG. 9 is for illustration only. Other embodiments could be used without departing from the scope of the present disclosure.

P=32 antenna ports 905 comprises $N_1=8$ and $N_2=4$. The codebook is constructed under the same principle as in FIG. 7. In this case, the co-phasing to be applied to the four rows is a 4×1 vector, $V^{(1)}_k = [1 \ u_k \ u_{2k} \ u_{3k}]^t$, where $u_k = e^{j\pi k/2}$, k=0, 1, 2, 3 or $u_k = e^{j\pi k/4}$, k=0, 1, 2, 3. In this case, the rank-1 and rank-2 precoder is constructed as:

$$W^{(1)}_{m,n,k}(=V^{(1)}_k \otimes W^{(1)}_{m,n}) = \frac{1}{\sqrt{2}}\begin{bmatrix} W^{(1)}_{m,n} \\ u_k W^{(1)}_{m,n} \\ u_{2k} W^{(1)}_{m,n} \\ u_{3k} W^{(1)}_{m,n} \end{bmatrix}; \quad (11)$$

$$W^{(2)}_{m,m',n,k}(=V^{(1)}_k \otimes W^{(2)}_{m,m',n}) = \frac{1}{\sqrt{2}}\begin{bmatrix} W^{(2)}_{m,m',n} \\ u_k W^{(2)}_{m,m',n} \\ u_{2k} W^{(2)}_{m,m',n} \\ u_{3k} W^{(2)}_{m,m',n} \end{bmatrix}. \quad (12)$$

Similarly, a new codebook can be constructed according to the same principle as in FIG. 7 and FIG. 9, for arbitrary numbers of $N_1$ and $N_2$; $W^{(1)}_{m,n,k}$ and $W^{(2)}_{m,m'n,k}$ will comprise ($N_2 \times 1$) block matrices where each block corresponds to $u_k W_{m,n}^{(1)}$, k=0, 1, 2, ..., $N_2$; and $u_k = e^{j\pi k/N_2}$.

Figure 10:
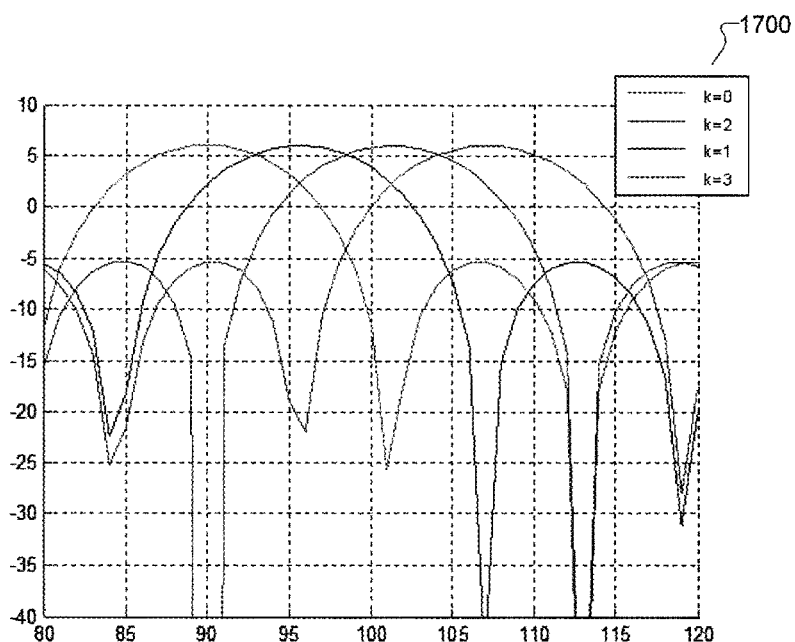
FIG. 10 illustrates the example beam patterns according to this disclosure.

FIG. 10 shows the example beam patterns 1000 according to embodiments of the present disclosure. The embodiment shown in FIG. 10 is for illustration only. Other embodiments could be used without departing from the scope of the present disclosure.

The beam patterns 1000 is constructed with $[1 \; u_k \; u_{2k} \; u_{3k}]^t$ and $u_k = e^{j\pi k/4}$, k=0, 1, 2, 3, where antennas are spaced apart by 1.28λ in the vertical domain. The example shown in FIG. 10e shows that the elevation angle range of 90° to 115° are well-covered, the range of which corresponds to typical user elevation angle distribution.

PMI Feedback Indices

The UE 116 decomposes a configuration of the 2D antenna array, using the first number and second number. The UE 116 selects a preferred or recommended precoder based on a performance metric. For instance, the UE selects the optimized precoder that maximizes the outcome of a performance metric which is a function of a channel state and a precoder. The UE 116 reports three PMI indices, $i_1$, $i_2$, and $i_3$, for informing eNB of m, m', n, k, used for constructing a precoder according to a codebook construction associated with FIG. 7, FIG. 8, or FIG. 9. In one method, $i_1$, $i_2$ correspond to precoders $W_{m,n,k}^{(1)}$ and $W_{m,m',n}^{(2)}$ according to the relation in TABLE 5 and TABLE 6 respectively for the cases of RI=1 and RI=2; and $i_3$ is mapped to k according to relation of k=$i_3$.

As k=$i_3$ is essentially a vertical beam index, which does not change quickly over time and frequency. Hence, it is proposed to jointly feedback $i_1$ and $i_3$ in PUCCH feedback modes.

Figure 11:
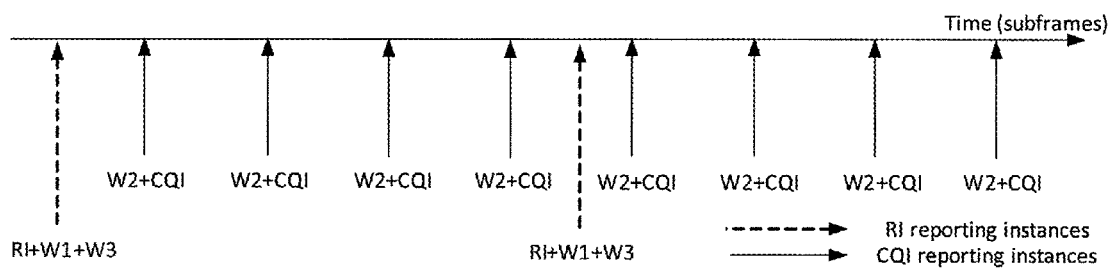
FIG. 11 illustrates a PUCCH feedback according to embodiments of this disclosure.

FIG. 11 illustrate a PUCCH feedback according to embodiments of the present disclosure. The embodiment shown in FIG. 11 is for illustration only. Other embodiments could be used without departing from the scope of the present disclosure.

In certain embodiments, UE 116 is configured with PUCCH feedback mode 1-1 submode 1. Then, the UE 116 reports rank index (RI), $i_1$ and $i_3$ in RI reporting instances, and the UE reports $i_2$ and corresponding CQI in PMI/CQI reporting instances. In FIG. 11, $i_1$, $i_2$ and $i_3$ are denoted as W1, W2 and W3.

For the joint encoding of RI, $i_1$ and $i_3$, two methods are designed in below TABLE 7 and TABLE 8. In one method illustrated in TABLE 7, the numbers of states for RI=1 and RI=2 case are both 8, the same as Rel-10 8-Tx codebook. To jointly encode $i_1$ and $i_3$, it is proposed to uniformly subsample $i_1$ with sampling factor 4, and uniformly subsample $i_3$ with subsampling factor 2. In this case, the joint coding index 0, 1, ... and 7 for RI/PMI1/PMI3 that is for RI=1, would correspond to ($i_1$, $i_3$)=(0, 0), (0, 1), (4, 0), (4, 1), (8, 0), (8, 1), (12, 0) and (12, 1).

TABLE 7

Joint encoding of RI, and for PUCCH mode 1-1 submode 1

| Value of joint encoding of RI and the first and the third PMI RI/PMI1/PMI3 | RI | Codebook index $i_1$ | Codebook index $i_3$ |
|---|---|---|---|
| 0-7 | 1 | $4\left\lfloor \dfrac{I_{RI/PMI1/PMI3}}{2} \right\rfloor$ | $I_{RI/PMI1/PMI3}$ mod 2 |
| 8-15 | 2 | $4\left\lfloor \dfrac{(I_{RI/PMI1/PMI3} - 8)}{2} \right\rfloor$ | $I_{RI/PMI1/PMI3}$ mod 2 |

In another method illustrated in TABLE 8, the numbers of states for RI=1 and RI=2 case are both 16, double the corresponding number of states in Rel-10 8-Tx codebook. To jointly encode $i_1$ and $i_3$, it is proposed to uniformly subsample $i_1$ with sampling factor 4, but not to subsample $i_3$, in order to maintain the elevation beamforming gain. In this case, the joint coding index 0, 1, ... and 15 for RI/PMI1/PMI3 that is for RI=1, would correspond to ($i_1$, $i_3$)=(0, 0), (0, 1), (0, 2), (0, 3), (4, 0), (4, 1), (4, 2), (4, 3), (8, 0), (8, 1), (8, 2), (8, 3), (12, 0), (12, 1), (12, 2) and (12, 3).

TABLE 8

Joint encoding of RI, $i_1$ and $i_3$ for PUCCH mode 1-1 submode 1

| Value of joint encoding of RI and the first and the third PMI RI/PMI1/PMI3 | RI | Codebook index $i_1$ | Codebook index $i_3$ |
|---|---|---|---|
| 0-15 | 1 | $4\left\lfloor \dfrac{I_{RI/PMI1/PMI3}}{4} \right\rfloor$ | $I_{RI/PMI1/PMI3}$ mod 4 |
| 15-31 | 2 | $4\left\lfloor \dfrac{(I_{RI/PMI1/PMI3} - 16)}{4} \right\rfloor$ | $I_{RI/PMI1/PMI3}$ mod 4 |

Figure 12A:
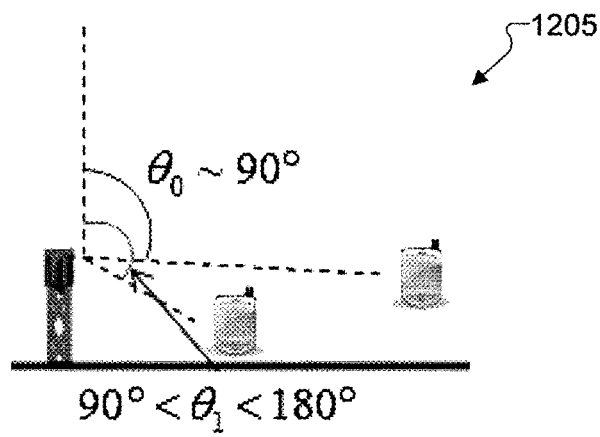
FIGS. 12A and 12B illustrate an example UE elevation angle distribution in cellular wireless systems in urban macro (UMa) and urban micro (UMi) cases according to this disclosure.

FIG. 12A illustrates an example UE elevation angle distribution 1205 in cellular wireless systems in urban macro (UMa) and urban micro (UMi) cases, according to embodiments of the present disclosure. The embodiment shown in FIG. 12 is for illustration only. Other embodiments could be used without departing from the scope of the present disclosure.

Figure 12B:
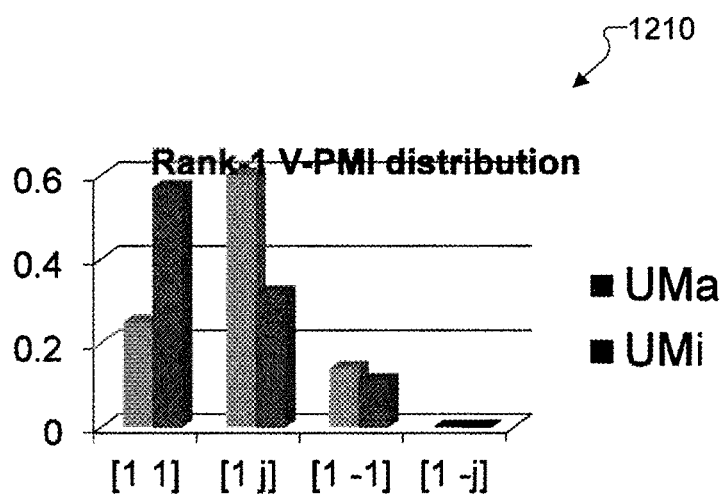

The elevation angle (θ) is defined in such a way that to the zenith is zero degree, and to the horizon is 90 degrees. In most cases, base station serves UEs below the base station antennas, in which case the elevation angle is 90 degrees or larger. This intuition is verified by simulation results 1210 as shown in FIG. 12B. As for $V_k^{(1)}$ precoders, [1 1] and [1 j] are most frequently chosen, each of which respectively corresponds to an elevation angle of 90 degrees and an angle between 90 degrees and 180 degrees.

In some embodiments, the $V_k^{(1)}$ codebook comprises two precoders:

$$\left\{ \frac{1}{\sqrt{2}} \begin{bmatrix} 1 \\ 1 \end{bmatrix}, \frac{1}{\sqrt{2}} \begin{bmatrix} 1 \\ j \end{bmatrix} \right\},$$

so that UE 116 can recommend one of the two elevation steering angles of θ=90° and 90°<θ<180°.

In some embodiments, $V_k^{(1)}$ codebook comprises four precoders as in other embodiments of the present disclosure, and UE 116 can report a codebook index out of k=0, 1, 2, 3 when the PMI is reported on PUSCH. When the PMI is reported on PUCCH and when a certain feedback mode is configured, UE 116 reports a codebook index out of a subsampled set.

In one method, the subsampled set corresponds to $$\left\{ \frac{1}{\sqrt{2}} \begin{bmatrix} 1 \\ 1 \end{bmatrix}, \frac{1}{\sqrt{2}} \begin{bmatrix} 1 \\ j \end{bmatrix} \right\},$$

so that UE 116 recommends one of the two elevation steering angles of θ=90° and 90°<θ<180°.

In another method, the subsampled set corresponds to $$\left\{\frac{1}{\sqrt{2}}\begin{bmatrix}1\\1\end{bmatrix}, \frac{1}{\sqrt{2}}\begin{bmatrix}1\\-1\end{bmatrix}\right\},$$

so that UE 116 recommends one of the two precoders separated farthest in the angular domain. This method can improve MU-MIMO throughput, when eNB receives PMI constructed according to this method and applies the recommended precoders in the MU-MIMO transmissions.

In another method, the subsampled set is higher-layer configured, e.g., between $$\left\{\frac{1}{\sqrt{2}}\begin{bmatrix}1\\1\end{bmatrix}, \frac{1}{\sqrt{2}}\begin{bmatrix}1\\j\end{bmatrix}\right\}$$

and $$\left\{\frac{1}{\sqrt{2}}\begin{bmatrix}1\\1\end{bmatrix}, \frac{1}{\sqrt{2}}\begin{bmatrix}1\\-1\end{bmatrix}\right\}.$$

Although the present disclosure has been described with an exemplary embodiment, various changes and modifications may be suggested to one skilled in the art. It is intended that the present disclosure encompass such changes and modifications as fall within the scope of the appended claims.

What is claimed:

1. A base station configured to communicate with a user equipment (UE), the base station comprising:
a transceiver configured to:
transmit, to the UE, Channel State Information-Reference Signal (CSI-RS) according to a CSI-RS configuration comprising a first and a second numbers of antenna ports, and downlink signals comprising the CSI-RS configuration; and
receive uplink signals comprising a plurality of CSI reports from the UE; and
a processor configured to:
extract a rank indicator (RI) and at least three precoder matrix indicators (PMIs) from the plurality of CSI reports; and
determine:
a component precoder on the first number of antenna ports, using a first PMI and a second PMI among the at least three PMIs;
a complex number u, using a third PMI among the at least three PMIs; and
a composite precoder equal to a block matrix comprising $N_r$ row blocks whose n-th row block is a product of $u^{n-1}$ and the component precoder, wherein $N_r$ is equal to the second number of antenna ports, and $n \in \{1, 2, \ldots, N_r\}$.

2. The base station of claim 1, wherein:
when the second number of antenna ports, $N_r$ is equal to 2, the block matrix for the composite precoder is in a form of $$\frac{1}{\sqrt{Q}}\begin{bmatrix}W\\uW\end{bmatrix},$$

wherein Q is a power normalization factor, W is the component precoder, and u is the complex number.

3. The base station of claim 1, wherein:
when the second number of antenna ports is $N_r=4$, the block matrix for the composite precoder is in a form of $$\frac{1}{\sqrt{Q}}\begin{bmatrix}W\\uW\\u^2W\\u^3W\end{bmatrix},$$

wherein Q is a power normalization factor, W is the component precoder, and u is the complex number.

4. The base station of claim 1, wherein:
$u=e^{j\pi k/2}$, and $k=0, 1, 2, 3$ that corresponds to the third PMI.

5. The base station of claim 1, wherein when the first number of antenna ports is 8 and the RI is one, the component precoder is $$W_{m,n}^{(1)} = \frac{1}{\sqrt{8}}\begin{bmatrix}v_m\\\varphi_n v_m\end{bmatrix},$$

wherein $\varphi_n = e^{j\pi n/2}$ $v_m = [1 \ e^{j2\pi m/32} \ e^{j4\pi m/32} \ e^{j6\pi m/32}]^T;$ and m and n are determined by the following table, where $i_1$ and $i_2$ respectively correspond to the first and the second PMIs

| | | | | | $i_2$ | | | |
|---|---|---|---|---|---|---|---|---|
| $i_1$ | 0 | 1 | 2 | 3 | 4 | 5 | 6 | 7 |
| 0-15 | $W_{2i_1,0}^{(1)}$ | $W_{2i_1,1}^{(1)}$ | $W_{2i_1,2}^{(1)}$ | $W_{2i_1,3}^{(1)}$ | $W_{2i_1+1,0}^{(1)}$ | $W_{2i_1+1,1}^{(1)}$ | $W_{2i_1+1,2}^{(1)}$ | $W_{2i_1+1,3}^{(1)}$ |
| | | | | | $i_2$ | | | |
| $i_1$ | 8 | 9 | 10 | 11 | 12 | 13 | 14 | 15 |
| 0-15 | $W_{2i_1+2,0}^{(1)}$ | $W_{2i_1+2,1}^{(1)}$ | $W_{2i_1+2,2}^{(1)}$ | $W_{2i_1+2,3}^{(1)}$ | $W_{2i_1+3,0}^{(1)}$ | $W_{2i_1+3,1}^{(1)}$ | $W_{2i_1+3,2}^{(1)}$ | $W_{2i_1+3,3}^{(1)}$ |

6. The base station of claim 1, wherein when the first number of antenna ports is 8 and the RI is two, the first component precoder is $$W_{m,m',n}^{(2)} = \frac{1}{4}\begin{bmatrix} v_m & v_{m'} \\ \varphi_n v_m & -\varphi_n v_{m'} \end{bmatrix},$$

wherein $$\varphi_n = e^{j\pi n/2}$$

$$v_m = [1 \; e^{j2\pi m/32} \; e^{j4\pi m/32} \; e^{j6\pi m/32}]^T; \text{ and}$$

m, m' and n are determined by the following table, where $i_1$ and $i_2$ respectively correspond to the first and the second PMIs

| $i_1$ | $i_2$ | | | |
|---|---|---|---|---|
| | 0 | 1 | 2 | 3 |
| 0-15 | $W^{(2)}_{2i_1,2i_1,0}$ | $W^{(2)}_{2i_1,2i_1,1}$ | $W^{(2)}_{2i_1+1,2i_1+1,0}$ | $W^{(2)}_{2i_1+1,2i_1+1,1}$ |
| | 4 | 5 | 6 | 7 |
| 0-15 | $W^{(2)}_{2i_1+2,2i_1+2,0}$ | $W^{(2)}_{2i_1+2,2i_1+2,1}$ | $W^{(2)}_{2i_1+3,2i_1+3,0}$ | $W^{(2)}_{2i_1+3,2i_1+3,1}$ |
| | 8 | 9 | 10 | 11 |
| 0-15 | $W^{(2)}_{2i_1,2i_1+1,0}$ | $W^{(2)}_{2i_1,2i_1+1,1}$ | $W^{(2)}_{2i_1+1,2i_1+2,0}$ | $W^{(2)}_{2i_1+1,2i_1+2,1}$ |
| | 12 | 13 | 14 | 15 |
| 0-15 | $W^{(2)}_{2i_1+2i_1+3,0}$ | $W^{(2)}_{2i_1,2i_1+3,1}$ | $W^{(2)}_{2i_1+1,2i_1+3,0}$ | $W^{(2)}_{2i_1+1,2i_1+3,1}$ |

7. The base station of claim 1, wherein when the uplink signals are transmitted on physical uplink control channels (PUCCH) and when a corresponding periodic reporting configuration is PUCCH mode 1-1 submode 1, the third PMI is transmitted together with the RI and the first PMI in each of RI reporting subframes.

8. A user equipment (UE) configured to communicate with a base station (BS), the UE comprising:
a transceiver configured to receive, from the BS, Channel State Information-Reference Signal (CSI-RS) according to a CSI-RS configuration comprising a first and a second numbers of antenna ports, and downlink signals comprising the CSI-RS configuration; and
a processor configured to determine a rank indicator (RI) and at least three precoder matrix indicators (PMIs) based on a composite precoder derived with the received CSI-RS,
the transceiver further configured to transmit, to the BS, uplink signals comprising a plurality of CSI reports comprising the rank indicator (RI) and the at least three precoder matrix indicators (PMIs), wherein:
the at least three PMIs comprises a first PMI and a second PMI used to indicate a component precoder on the first number of antenna ports for the RI, and a third PMI used to indicate a complex number u, and
the composite precoder is a block matrix comprising $N_r$ row blocks whose n-th row block is a product of $u^{n-1}$ and the component precoder, wherein $N_r$ is equal to the second number of antenna ports, and $n \in \{1, 2, \ldots, N_r\}$.

9. The UE of claim 8, wherein:
when the second number of antenna ports, $N_r$ is equal to 2, the block matrix for the composite precoder is in a form of $$\frac{1}{\sqrt{Q}}\begin{bmatrix} W \\ uW \end{bmatrix},$$

wherein Q is a power normalization factor, W is the component precoder, and u is the complex number.

10. The UE of claim 8, wherein:
when the second number of antenna ports is $N_r=4$, the block matrix for the composite precoder is in a form of $$\frac{1}{\sqrt{Q}}\begin{bmatrix} W \\ uW \\ u^2 W \\ u^3 W \end{bmatrix},$$

wherein Q is a power normalization factor, W is the component precoder, and u is the complex number.

11. The UE of claim 8, wherein:
$u = e^{j\pi k/2}$, and k=0, 1, 2, 3 that corresponds to the third PMI.

12. The UE of claim 8, wherein when the first number of antenna ports is 8 and the RI is one, the component precoder is $$W_{m,n}^{(1)} = \frac{1}{\sqrt{8}}\begin{bmatrix} v_m \\ \varphi_n v_m \end{bmatrix},$$

wherein $$\varphi_n = e^{j\pi n/2}$$

$$v_m = [1 \; e^{j2\pi m/32} \; e^{j4\pi m/32} \; e^{j6\pi m/32}]^T;$$

and m and n are determined by the following table, where $i_1$ and $i_2$ respectively correspond to the first and the second PMIs

| $i_1$ | $i_2$ | | | | | | | |
|---|---|---|---|---|---|---|---|---|
| | 0 | 1 | 2 | 3 | 4 | 5 | 6 | 7 |
| 0-15 | $W^{(1)}_{2i_1,0}$ | $W^{(1)}_{2i_1,1}$ | $W^{(1)}_{2i_1,2}$ | $W^{(1)}_{2i_1,3}$ | $W^{(1)}_{2i_1+1,0}$ | $W^{(1)}_{2i_1+1,1}$ | $W^{(1)}_{2i_1+1,2}$ | $W^{(1)}_{2i_1+1,3}$ |
| | $i_2$ | | | | | | | |
| $i_1$ | 8 | 9 | 10 | 11 | 12 | 13 | 14 | 15 |
| 0-15 | $W^{(1)}_{2i_1+2,0}$ | $W^{(1)}_{2i_1+2,1}$ | $W^{(1)}_{2i_1+2,2}$ | $W^{(1)}_{2i_1+2,3}$ | $W^{(1)}_{2i_1+3,0}$ | $W^{(1)}_{2i_1+3,1}$ | $W^{(1)}_{2i_1+3,2}$ | $W^{(1)}_{2i_1+3,3}$ |

13. The UE of claim 8, wherein when the first number of antenna ports is 8 and the RI is two, the first component precoder is $$W^{(2)}_{m,m',n} = \frac{1}{4}\begin{bmatrix} v_m & v_{m'} \\ \varphi_n v_m & -\varphi_n v_{m'} \end{bmatrix},$$

wherein $$\varphi_n = e^{j\pi n/2}$$

$$v_m = [1 \ e^{j2\pi m/32} \ e^{j4\pi m/32} \ e^{j6\pi m/32}]^T;$$

and m, m' and n are determined by the following table, where $i_1$ and $i_2$ respectively correspond to the first and the second PMIs

| $i_1$ | $i_2$ | | | |
|---|---|---|---|---|
|  | 0 | 1 | 2 | 3 |
| 0-15 | $W^{(2)}_{2i_1,2i_1,0}$ | $W^{(2)}_{2i_1,2i_1,1}$ | $W^{(2)}_{2i_1+1,2i_1+1,0}$ | $W^{(2)}_{2i_1+1,2i_1+1,1}$ |
|  | 4 | 5 | 6 | 7 |
| 0-15 | $W^{(2)}_{2i_1+2,2i_1+2,0}$ | $W^{(2)}_{2i_1+2,2i_1+2,1}$ | $W^{(2)}_{2i_1+3,2i_1+3,0}$ | $W^{(2)}_{2i_1+3,2i_1+3,1}$ |
|  | 8 | 9 | 10 | 11 |
| 0-15 | $W^{(2)}_{2i_1,2i_1+1,0}$ | $W^{(2)}_{2i_1,2i_1+1,1}$ | $W^{(2)}_{2i_1+1,2i_1+2,0}$ | $W^{(2)}_{2i_1+1,2i_1+2,1}$ |
|  | 12 | 13 | 14 | 15 |
| 0-15 | $W^{(2)}_{2i_1+2i_1+3,0}$ | $W^{(2)}_{2i_1,2i_1+3,1}$ | $W^{(2)}_{2i_1+1,2i_1+3,0}$ | $W^{(2)}_{2i_1+1,2i_1+3,1}$ |

14. The UE of claim 8, wherein when the uplink signals are transmitted on physical uplink control channels (PUCCH) and when a corresponding periodic reporting configuration is PUCCH mode 1-1 submode 1, the third PMI is transmitted together with the RI and the first PMI in each of RI reporting subframes.

15. A method for communicating with a base station (BS), the method comprising:
receiving, from the BS, Channel State Information-Reference Signal (CSI-RS) according to a CSI-RS configuration comprising a first and a second numbers of antenna ports, and downlink signals comprising the CSI-RS configuration;
determining a rank indicator (RI) and at least three precoder matrix indicators (PMIs) based on a composite precoder derived with the received CSI-RS, wherein:
the at least three PMIs comprises a first PMI and a second PMI used to indicate a component precoder on the first number of antenna ports for the RI, and a third PMI used to indicate a complex number u; and
the composite precoder is a block matrix comprising $N_r$ row blocks whose n-th row block is a product of $u^{n-1}$ and the component precoder, wherein $N_r$ is equal to the second number of antenna ports, and $n \in \{1, 2, \ldots, N_r\}$, and
transmitting, to the BS, uplink signals comprising a plurality of CSI reports comprising the RI and the at least three PMIs.

16. The method of claim 15, wherein:
when the second number of antenna ports, $N_r$ is equal to 2, the block matrix for the composite precoder is in a form of $$\frac{1}{\sqrt{Q}}\begin{bmatrix} W \\ uW \end{bmatrix},$$

wherein Q is a power normalization factor, W is the component precoder, and u is the complex number.

17. The method of claim 15, wherein:
when the second number of antenna ports is $N_r=4$, the block matrix for the composite precoder is in a form of $$\frac{1}{\sqrt{Q}}\begin{bmatrix} W \\ uW \\ u^2W \\ u^3W \end{bmatrix},$$

wherein Q is a power normalization factor, W is the component precoder, and u is the complex number.

18. The method of claim 15, wherein:
$u=e^{j\pi k/2}$, and k=0, 1, 2, 3 that corresponds to the third PMI.

19. The method of claim 15, wherein when the first number of antenna ports is 8 and the RI is one, the component precoder is $$W^{(1)}_{m,n} = \frac{1}{\sqrt{8}}\begin{bmatrix} v_m \\ \varphi_n v_m \end{bmatrix},$$

wherein $$\varphi_n = e^{j\pi n/2}$$

$$v_m = [1 \ e^{j2\pi m/32} \ e^{j4\pi m/32} \ e^{j6\pi m/32}]^T;$$

and m and n are determined by the following table, where $i_1$ and $i_2$ respectively correspond to the first and the second PMIs

| $i_1$ | $i_2$ | | | | | | | |
|---|---|---|---|---|---|---|---|---|
|  | 0 | 1 | 2 | 3 | 4 | 5 | 6 | 7 |
| 0-15 | $W^{(1)}_{2i_1,0}$ | $W^{(1)}_{2i_1,1}$ | $W^{(1)}_{2i_1,2}$ | $W^{(1)}_{2i_1,3}$ | $W^{(1)}_{2i_1+1,0}$ | $W^{(1)}_{2i_1+1,1}$ | $W^{(1)}_{2i_1+1,2}$ | $W^{(1)}_{2i_1+1,3}$ |
|  | 8 | 9 | 10 | 11 | 12 | 13 | 14 | 15 |
| 0-15 | $W^{(1)}_{2i_1+2,0}$ | $W^{(1)}_{2i_1+2,1}$ | $W^{(1)}_{2i_1+2,2}$ | $W^{(1)}_{2i_1+2,3}$ | $W^{(1)}_{2i_1+3,0}$ | $W^{(1)}_{2i_1+3,1}$ | $W^{(1)}_{2i_1+3,2}$ | $W^{(1)}_{2i_1+3,3}$ |

20. The method of claim 15, wherein when the first number of antenna ports is 8 and the RI is two, the first component precoder is $$W^{(2)}_{m,m',n} = \frac{1}{4}\begin{bmatrix} v_m & v_{m'} \\ \varphi_n v_m & -\varphi_n v_{m'} \end{bmatrix},$$

wherein $$\varphi_n = e^{j\pi n/2}$$

$$v_m = [1 \ e^{j2\pi m/32} \ e^{j4\pi m/32} \ e^{j6\pi m/32}]^T;$$

and m, m' and n are determined by the following table, where $i_1$ and $i_2$ respectively correspond to the first and the second PMIs

| | $i_2$ | | | | | | | |
|---|---|---|---|---|---|---|---|---|
| $i_1$ | 0 | 1 | 2 | 3 | 4 | 5 | 6 | 7 |
| 0-15 | $W^{(2)}_{2i_1,2i_1,0}$ | $W^{(2)}_{2i_1,2i_1,1}$ | $W^{(2)}_{2i_1+1,2i_1+1,0}$ | $W^{(2)}_{2i_1+1,2i_1+1,1}$ | $W^{(2)}_{2i_1+2,2i_1+2,0}$ | $W^{(2)}_{2i_1+2,2i_1+2,1}$ | $W^{(2)}_{2i_1+3,2i_1+3,0}$ | $W^{(2)}_{2i_1+3,2i_1+3,1}$ |
| | $i_2$ | | | | | | | |
| $i_1$ | 8 | 9 | 10 | 11 | 12 | 13 | 14 | 15 |
| 0-15 | $W^{(2)}_{2i_1,2i_1+1,0}$ | $W^{(2)}_{2i_1,2i_1+1,1}$ | $W^{(2)}_{2i_1+1,2i_1+2,0}$ | $W^{(2)}_{2i_1+1,2i_1+2,1}$ | $W^{(2)}_{2i_1,2i_1+3,0}$ | $W^{(2)}_{2i_1,2i_1+3,1}$ | $W^{(2)}_{2i_1+1,2i_1+3,0}$ | $W^{(2)}_{2i_1+1,2i_1+3,1}$ | where $$W^{(2)}_{m,m',n} = \frac{1}{4}\begin{bmatrix} v_m & v_{m'} \\ \varphi_n v_m & -\varphi_n v_{m'} \end{bmatrix}$$

\* \* \* \* \*